(12) United States Patent
Spivack et al.

(10) Patent No.: US 8,423,618 B1
(45) Date of Patent: *Apr. 16, 2013

(54) SYSTEMS AND METHODS FOR BLOCKING UNSOLICITED ELECTRONIC MAIL MESSAGES

(75) Inventors: Ira Victor Spivack, Reno, NV (US); Richard Paul White, Pacific Grove, CA (US); Alan Huang, Menlo Park, CA (US); Haw-minn Lu, San Diego, CA (US)

(73) Assignee: Engate Technology Corporation, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,241

(22) Filed: Mar. 2, 2010

Related U.S. Application Data

(63) Continuation-in-part of application No. 12/317,938, filed on Dec. 30, 2008, which is a continuation of application No. 10/761,883, filed on Jan. 20, 2004, now Pat. No. 7,490,128, which is a continuation of application No. 10/238,812, filed on Sep. 9, 2002, now abandoned, application No. 12/716,241, which is a continuation-in-part of application No. 10/761,864, filed on Jan. 20, 2004, now Pat. No. 7,716,351, which is a continuation of application No. 10/238,076, filed on Sep. 9, 2002, now abandoned, application No. 12/716,241, which is a continuation-in-part of application No. 10/761,894, filed on Jan. 20, 2004, now Pat. No. 7,673,058, which is a continuation of application No. 10/238,216, filed on Sep. 9, 2002, now abandoned.

(51) Int. Cl.
*G06F 15/16* (2006.01)

(52) U.S. Cl.
USPC ............................ 709/206; 709/200; 709/203

(58) Field of Classification Search .................. 709/200, 709/206, 223
See application file for complete search history.

(56) References Cited

U.S. PATENT DOCUMENTS

| | | | | |
|---|---|---|---|---|
| 6,321,267 | B1 * | 11/2001 | Donaldson | 709/229 |
| 6,654,787 | B1 * | 11/2003 | Aronson et al. | 709/206 |
| 6,868,498 | B1 * | 3/2005 | Katsikas | 726/14 |
| 7,080,123 | B2 * | 7/2006 | Freed | 709/206 |
| 7,103,372 | B1 * | 9/2006 | Kupsh | 455/466 |
| 7,222,157 | B1 * | 5/2007 | Sutton et al. | 709/206 |
| 7,239,866 | B2 * | 7/2007 | Cai et al. | 455/414.1 |
| 7,249,175 | B1 * | 7/2007 | Donaldson | 709/225 |
| 7,882,193 | B1 * | 2/2011 | Aronson et al. | 709/207 |
| 2002/0184209 | A1 * | 12/2002 | Sato et al. | 707/5 |
| 2003/0191969 | A1 * | 10/2003 | Katsikas | 713/201 |
| 2005/0188045 | A1 * | 8/2005 | Katsikas | 709/206 |

OTHER PUBLICATIONS

Nathan Patwardhan, Ellen Siever and Stephen Spainhour, "Perl in a Nutshell", O'Reilly, ISBN 0-596-00241-6 Second Edition, published Jun. 2002, Part VII: Network Programming, Chapter 16: Email Connectivity, Available on-line: http://docstore.mik.ua/orelly/perl3/perlnut/index.htm.*

\* cited by examiner

*Primary Examiner* — John Follansbee
*Assistant Examiner* — Anthony Mejia
(74) *Attorney, Agent, or Firm* — San Diego IP Law Group, LLP

(57) ABSTRACT

The spam blocker monitors the SMTP/TCP/IP conversation between a sending message transfer agent MTA_0 and a receiving message transfer agent MTA_1; catches MTA_0's IP address IP_0, MTA_0's declared domain D_0, from-address A_0; to-address A_1, and the body of the message; and uses this source and content information to test for unsolicited messages. It alters the conversation to reject, divert or intercept the message if the message is suspected of being unsolicited.

3 Claims, 36 Drawing Sheets

CONNECTION ESTABLISHMENT
  S: 220
  F: 421

HELO
  S: 250
  E: 500, 501, 504, 421

MAIL
  S: 250
  F: 552, 451, 452
  E: 500, 501, 421

RCPT
  S: 250, 251
  F: 550, 551, 552, 553, 450, 451, 452
  E: 500, 501, 503, 421

DATA
  I: 354 -> data -> S: 250
           F: 552, 554, 451, 452
  F: 451, 554
  E: 500, 501, 503, 421

RSET
  S: 250
  E: 500, 501, 504, 421

SEND
  S: 250
  F: 552, 451, 452
  E: 500, 501, 502, 421

SOML
  S: 250
  F: 552, 451, 452
  E: 500, 501, 502, 421

SAML
  S: 250
  F: 552, 451, 452
  E: 500, 501, 502, 421

VRFY
  S: 250, 251
  F: 550, 551, 553
  E: 500, 501, 502, 504, 421

EXPN
  S: 250
  F: 550
  E: 500, 501, 502, 504, 421

HELP
  S: 211, 214
  E: 500, 501, 502, 504, 421

NOOP
  S: 250
  E: 500, 421

QUIT
  S: 221
  E: 500

TURN
  S: 250
  F: 502
  E: 500, 503

FIG. 2 (prior art)

214 Help message
    [Information on how to use the receiver or the meaning of a particular non-standard command;
    this reply is useful only to the human user]
220 <domain> Service ready
221 <domain> Service closing transmission channel
250 Requested mail action okay, completed
251 User not local; will forward to <forward-path>

354 Start mail input; end with <CRLF>.<CRLF>

421 <domain> Service not available, closing transmission channel
    [This may be a reply to any command if the service knows must shut down]
450 Requested mail action not taken: mailbox unavailable [E.g., mailbox busy]
451 Requested action aborted: local error in processing
452 Requested action not taken: insufficient system storage 500 Syntax error, command unrecognized [This may include errors such as command line too long]
501 Syntax error in parameters or arguments
502 Command not implemented
503 Bad sequence of commands
504 Command parameter not implemented
550 Requested action not taken: mailbox unavailable [E.g., mailbox not found, no access]
551 User not local; please try <forward-path>
552 Requested mail action aborted: exceeded storage allocation
553 Requested action not taken: mailbox name not allowed [E.g., mailbox syntax incorrect]
554 Transaction failed

FIG. 3 (prior art)

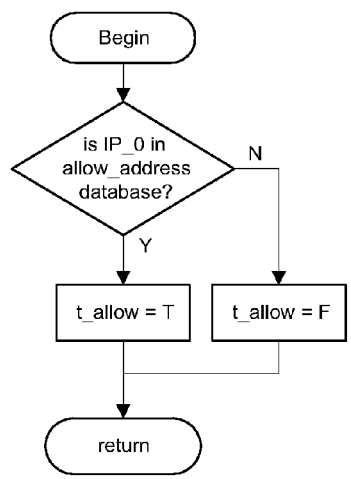
FIG. 17A
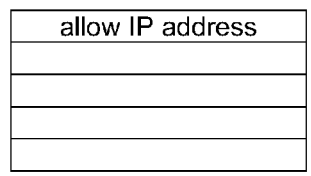
FIG.17B
| 66.75.160.12 | 65.54.232.7 | 64.4.55.7 | 64.4.50.7 |
| 65.54.254.145 | 64.4.56.135 | 64.4.55.135 | 64.4.49.199 |
| 65.54.232.71 | 64.4.55.71 | 64.4.50.71 | 64.4.49.135 |
FIG. 17C

| low prevent address | high prevent IP address |
|---|---|
|  |  |
|  |  |
|  |  |
|  |  |

| | | | |
|---|---|---|---|
| 4.19.93.159 | 61.16.2.72 | 65.174.29.52 | 129.71.235.57 |
| 4.43.46.14 | 63.162.162.157 | 65.211.149.230 | 131.161.40.61 |
| 4.43.46.15 | 63.163.139.83 | 65.88.90.10 | 139.130.177.67 |
| 4.43.46.17 | 64.0.241.210 | 66.115.47.112 | 146.243.16.156 |
| 12.101.140.178 | 64.14.127.28 | 66.115.47.144 | 148.235.134.146 |
| 12.101.199.26 | 64.159.91.198 | 66.123.51.203 | 148.235.89.20 |
| 12.101.61.98 | 64.251.16.152 | 66.47.187.38 | 154.123.213.3/28 |
| 12.109.16.67 | 64.251.16.153 | 66.74.*.* | 174.123.12.10-175.123.12.15 |
| 12.129.205.65 | 64.251.16.154 | 66.75.*.* | |
| 12.129.205.84 | 64.3.236.18 | 128.121.16.241 | |
| 12.237.79.6 | 65.171.144.13 | 128.121.16.248 | |

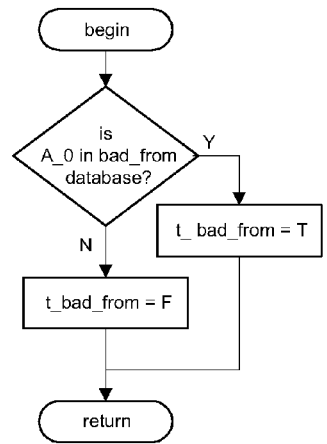
FIG. 21A
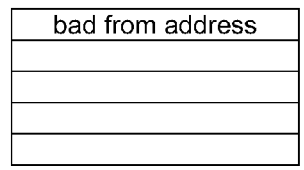
FIG. 21B
| *@*.cl | *@*barota.com | *@*.br |
| *@thejanusgroup.com | *@*.nl | *@*agoramail.net |
| *@*nymphos* | *@netpaloffers.com | ipas@* |
| *@*ramshack.net | *@*.no | *@yourmailsource.com |
| *@freegasdaily.com | *@*porn* | fuck*.* |
| *@*emailsvc.net | *@*mercadobr.com | *fuck*.* |
| *@*bbwgroup.com | *@*medianetgroup.net | *@*.in |
| *@*hostingcheck.com | *@*myrealbox.com | |
| *@*linksynergy.com | *@*aweber.com | |
FIG. 21C

| time | "To" address (A_1) |
|---|---|
|  |  |
|  |  |
|  |  |
|  |  |

FIG. 28

| time | "To" address (A_1) | "From" address (A_0) | reason for rejection |
|---|---|---|---|
|  |  |  |  |
|  |  |  |  |
|  |  |  |  |
|  |  |  |  |

FIG. 29

| to-address (A_1) | save spam? (Y/N) |
|---|---|
|  |  |
|  |  |
|  |  |
|  |  |

FIG. 30

| to-address (A_1) | diversion address (A'_1) |
|---|---|
|  |  |
|  |  |
|  |  |
|  |  |

FIG. 31

SYSTEMS AND METHODS FOR BLOCKING UNSOLICITED ELECTRONIC MAIL MESSAGES

RELATED APPLICATIONS INFORMATION

This application is a continuation-in-part of U.S. patent application Ser. No. 12/317,938, entitled "Unsolicited Message Rejecting Communications Processor" filed on Dec. 30, 2008, which is a continuation of U.S. Pat. No. 7,490,128, which is entitled "Unsolicited Message Rejecting Communications Processor" issued on Feb. 10, 2009 which is a continuation of U.S. patent application Ser. No. 10/238,812 entitled "An Unsolicited Message Rejecting Communications Processor," filed on Sep. 9, 2002, now abandoned, all of which are incorporated by reference herein in its entirety as if set forth in full.

This application is also a continuation-in-part of U.S. patent application Ser. No. 10/761,864, entitled "An Unsolicited Message Diverting Communications Processor", filed on Jan. 20, 2004, which is a continuation of U.S. patent application Ser. No. 10/238,076 entitled "An Unsolicited Message Diverting Communications," filed on Sep. 9, 2002, now abandoned, all of which are incorporated by reference herein in its entirety as if set forth in full.

This application is also a continuation-in-part of U.S. patent application Ser. No. 10/761,894, entitled "An Unsolicited Message Intercepting Communications Processor," filed on Jan. 20, 2004, which is a continuation of U.S. patent application Ser. No. 10/238,216 entitled "An Unsolicited Message, Intercepting Communications Processor," filed on Sep. 9, 2002, now abandoned, all of which are incorporated by reference herein in its entirety as if set forth in full.

TECHNICAL FIELD

This invention relates generally to the processing of electronic mail (e-mail) messages and specifically with the processing of unsolicited e-mail messages, commonly known as unsolicited commercial email (UCE) or SPAM, on a client's e-mail server.

BACKGROUND ART

E-mail has become an important means of communications. Unfortunately, unsolicited e-mail messages, commonly referred to as SPAM, are cluttering this communications channel. This unsolicited e-mail wastes Internet bandwidth, local area network bandwidth, and storage. This translates into lost productivity, increased computing and increased communication costs. Some of this unsolicited e-mail is also offensive and inappropriate for non-adult audiences.

The spammer collects a list of e-mail address, appends these addresses to their message, and queues these messages on their e-mail server (message transfer agent) 2, in FIG. 1. He then connects their e-mail server to the Internet 1, via in a rogue Internet service provider, a dial-up connection, a digital scriber loop (DSL) connection, or a cable modem connection and sends out their message to gateway message transfer agents 5, associated with each e-mail address. These gateway message transfer agents either stores the message in an e-mail mailbox associated with client 3, or forwards the message to an another message transfer agent (MTA) on the same local area network.

There are four basic approaches to trying to detect junk e-mail messages. One approach used a community set of rules to determine whether or not a message is spam. This approach is used in Razor, an open source Linux solution, and by companies such as CloudMark (based on Razor) and SpamNet. The problem is getting a community of users to agree on a common set of rules.

A second approach uses a set of rule base filters which are periodically updated by the provider and downloaded by the client to determine whether or not a message is spam. The problem is that the set of rules have to be updated and downloaded periodically.

A third approach uses a set of permissions to determine whether or not a message is spam. The problem is that it is impossible for somebody not on user's permission list to send a message to the user.

A fourth approach uses a "whitelist" and a "blacklist" to determine whether or not a message is spam. The problem is that the spammers are constantly changing their return address and declared domain names.

There are three basic ways of implementing these approaches. One implementation approach is in the Message transfer agent. This approach adds some rules to the MTA. The problem is that the MTA program is complicated and inflexible. This limits the kind of rules that can be implemented.

A second implementation approach involves placing the filters between the e-mail client and the Message Transfer Agent. The problem is that some of the information which can be used to help determine whether or not a message is spam is lost or buried.

A third implementation approach involves adding some filters to the e-mail client, Mail User Agent (MUA). The problem is that the e-mail client add-in interface is not an open standard, which leads to compatibility problems.

A problem with these approaches is that they are "reactive." The spam has already been received by the server and relayed via a local area network to client's computer. The spam message has already consumed the server's Internet bandwidth, local area network bandwidth, and client storage.

Another problem with these approaches is that they are based on the from-address, the subject line, or the message body; all of which can be easily forged or changed.

SUMMARY OF INVENTION

A method and appliance for blocking spam message comprises monitoring an SMTP transaction between a remote sending MTA and a local receiving MTA. One method is to relay SMTP commands and messages between the sending MTA and the receiving MTA. If the message is determined to be a spam message, it can be intercepted before the .\r\n terminator is transmitted to the receiving MTA, the recipient address can be rewritten to divert the email message, or the message can be rejected by issuing a permanent failure reply to an SMTP command from the sending MTA.

A variety of tests is used to determined whether an email message is a spam message. These tests include an IP resolve test, an open relay test, an allow address test, a prevent address test, an echo domain test, a forged domain test, a bad from address test, a suspect domain test, a "to from" test, a "no filter" test, a "yes filter" test, a bad word test, and an bad fingerprint test.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 (prior art) shows a list of simple mail transfer protocol (SMTP) commands and their associated reply codes FIG. 3 (prior art) shows a list of SMTP reply codes and what they mean;

FIG. 17A is a flowchart illustrating an exemplary method for performing the allow address test;

FIG. 17B shows an exemplary data structure that can be used in the allow address database;

FIG. 17C shows some exemplary allow address database entries;

FIG. 21A is a flowchart illustrating an exemplary method for performing the bad from address test;

FIG. 21B shows an exemplary data structure that can be used in the bad from database;

FIG. 21C shows examples of bad from database entries;

FIG. 28 shows an exemplary data structure that can be used in the allowed_connection database;

FIG. 29 shows an exemplary data structure that can be used in the rejected_connection database;

FIG. 30 shows an exemplary data structure that can be used in the save_spam database; and FIG. 31 shows an exemplary data structure that can be used in the diversion database.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 5:
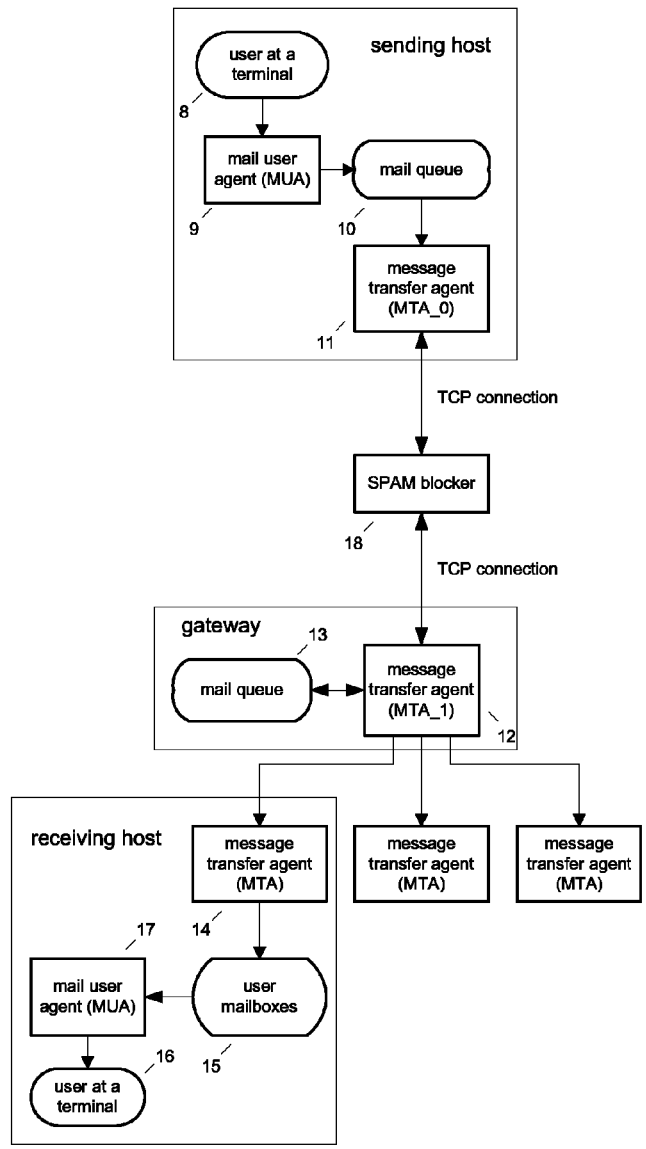
FIG. 5 depicts in overview a typical deployment of an embodiment of the present invention.

FIG. 5 depicts in overview a typical deployment of an embodiment of the present invention. User, 8 sits at a terminal and types an e-mail message (also referred to simply as a "mail" message) into mail user agent (MUA) 9 such as Microsoft Outlook Express or Eudora. This e-mail message is then sent to mail queue 10 associated with a message (or mail) transfer agent (MTA) 11 such as Unix Sendmail, or Microsoft Exchange. MTA 11 contacts MTA 12 associated with the to-address of the e-mail message and negotiates the transfer of the queued mail message. If the negotiations are completed in a satisfactory manner, the message is transferred and stored in queue 13 associated with gateway MTA 12. MTA 12 then either stores the mail message in the user's mailbox 15 or relays the mail message to another MTA 14 associated with the user. Receiving user 16 then uses MUA 17 to fetch the mail message from mailbox 15.

Spam blocker 18 is inserted between MTA 11 and MTA 12. Spam blocker 18 monitors the conversation between MTA 11 and MTA 12, uses some of the transferred information to decide if the message is spam, and manipulates the conversation if the message is determined to be spam. Spam blocker 18 operates at the SMTP protocol level. This increases the accuracy of spam determination since more information is available. This reduces compatibility issues since SMTP is an established standard and since there are no in-band or other out-of-band communication channels between MTA 11 and MTA 12 to deal with. Operating at the protocol level increases the types of responses available for dealing with the unsolicited mail messages.

Figure 6:
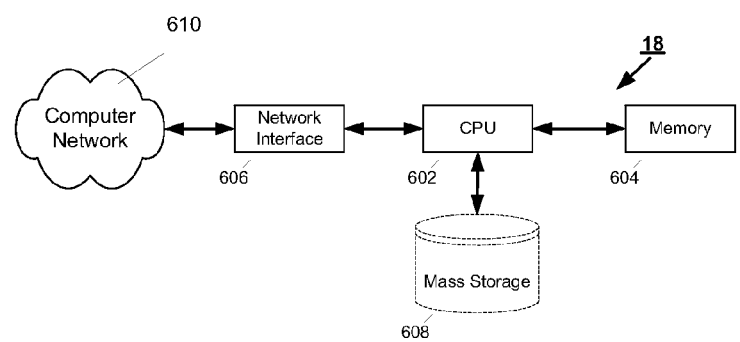
FIG. 6 illustrates an embodiment of a spam blocking appliance.

Spam blocker 18 can be implemented as a stand alone network appliance as depicted in FIG. 5. FIG. 6 illustrates an embodiment of a spam blocking appliance. Spam blocker 18 comprises processor 602, memory 604, and network interface 606. Spam blocker 18 can optionally comprise mass storage 608. Processor 602 can be one more central processing units (CPUs), application specific integrated circuit (ASIC), or field-programmable gate array (FPGA). Processor 602 is coupled to network interface 606 and memory 604 often through the use of one or more data buses. Memory 604 can comprise dynamic random access memory (DRAM) and/or static random access memory (SRAM). Memory 604 can comprise volatile and/or non-volatile memory. Memory 604 can also include one or more level of caches and in implementations where mass storage 608 is used, memory 604 can also comprise virtual memory implemented in conjunction with mass storage 608. Memory 604 contains instructions such as an operating system and application specific executables which direct the operation of processor 602. Furthermore, memory 604 also contains temporary variables used in the execution of the application specific programs. For example, it may be used to hold the values of the various tests described below (e.g., t_suspect_domain, t_forged_domain, t_open_relay). Among the instructions contained in memory 604 are instructions that implement some of the methods described below (e.g. FIGS. 11A-F, FIGS. 12A-E or FIGS. 13A-F), depending on which embodiment of the spam blocker is implemented. These instructions also direct the processor to interact with a remote host through the use of network interface 606 which is coupled to computer network 610 such as the Internet. In another embodiment, a second network interface is used. One network interface is used to communicate to external message transfer agents (e.g. MTA 11) and the second interface is used to communicate to the local message transfer agent (e.g. MTA 12).

Mass storage 608 can be a hard disk, optical disk, solid state disk (such as flash memory). In one embodiment, the databases described below can be stored in mass storage 608. In another embodiment, mass storage 608 is not needed to store the database(s) and the database(s) are downloaded from an external source through network interface 606.

It should be noted that the example of FIG. 6 is a typical implementation of a spam blocker, but one of ordinary skill in the art will no doubt be aware of other variations. Though described here as implemented generally in software, spam blocker 18 could be implemented as hardware, software, firmware, or a combination thereof.

Embodiments of spam blocker 18 can dispose of detected spam in several ways. Examples include rejecting the email message prior to delivery to MTA 12, diverting the email message to a different email address where it can be stored in a separated mailbox and intercepting the email message prior to storage of the email message into the recipient's mailbox (e.g., mailbox 15). Additionally embodiments of spam blocker 18 can dispose of detected spam by any combination of these methods. For the purposes of this disclosure, spam blocker 18 is described in terms of three embodiments; however, spam blocker 18 can implement more than one of these variants. For example, the spam disposal method could be implemented in software with all three variants available to the end user who can configure any one of these behaviors or combination thereof.

As mentioned previously, the operation of spam blocker 18 is tightly coupled with the SMTP protocol. The SMTP protocol consists of a set of commands and a set of replies. The set of commands, HELO, MAIL, RCPT, DATA, RSET, SEND, SOML, SAML, VRFY, EXPN, HELP, NOOP, QUIT, and TURN is shown in FIG. 2 and the set of replies shown in FIG. 3 are detailed in RFC 821 (Postel 1982) and discussed in *TCP/IP Illustrated Volume* 1, *The Protocols* by W. Richards Stevens (Addison Wesley, ISBN 0-201-63346-9). The possible replies associated with each command are shown in FIG. 2. An "S" class reply indicates a successful completion of the command. An "F" class reply indicates a failure in completion of the command. An "E" class reply indicates an error in the completion of the command. A reply code beginning with a 1, 2, 3, 4, and 5 respectively indicate a positive preliminary reply, a positive completion reply, positive intermediate reply, transient negative completion reply, and permanent negative completion reply. The format of a mail message is specified in RFC 822 (Crocker 1982).

Figure 4:
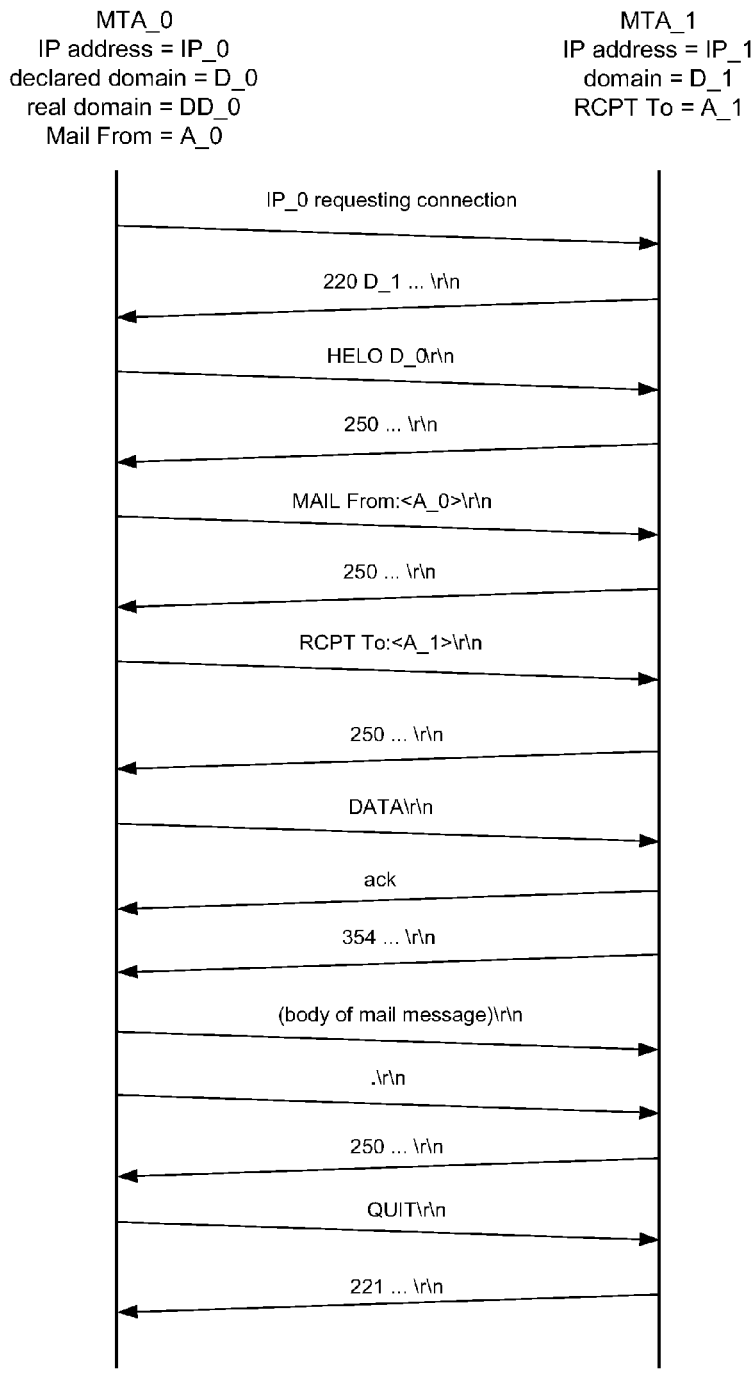
FIG. 4 (prior art) shows a timeline of a typical message transfer using SMTP.

FIG. 4 shows an example of a timeline of a normal mail transfer. For purposes of explanation, assume that the sending MTA 11 is called MTA_0 and has an IP address of IP_0, a declared domain name of D_0, a real domain name DD_0, and the mail message has a from-address of A_0 and that the receiving MTA 12 is called MTA_1 and has an IP address of IP_1, a domain name of D_1, and it is associated with an user mail address of A_1.

MTA_0 sends a message to MTA_1 requesting to establish a connection. MTA_1 then responds with a 220 reply which includes its domain name D_1. MTA_0 then sends a HELO command with its declared domain name D_0. MTA_1 then responds with a 250 reply to acknowledge the successful completion of the HELO command. MTA_0 then sends a MAIL command with a message from-address A_0. MTA_1 then sends a 250 to acknowledge the successful completion of the MAIL command. MTA_0 then sends a RCPT command with a to-address A_1. MTA_1 then sends a 250 reply to acknowledge successful completion of the RCPT command. MTA_0 then sends a DATA command. MTA_1 then sends a 354 reply to acknowledge its ability to receive the data. MTA_0 then sends the data, the body of the message. MTA_0 then sends a .\r\n to indicate the end of the data. MTA_1 then sends a 250 to acknowledge successful transfer of the data. MTA_0 then sends a QUIT command. MTA_1 then sends a 221 to acknowledge the QUIT command and closes its end of the TCP connection. Upon receipt of the 221 reply, MTA_0 closes down its end of the TCP connection.

As mentioned previously referring to FIG. 5, Spam blocker 18, is inserted between MTA_0 and MTA_1. The spam blocker monitors the conversation between MTA 11 and MTA 12, uses some of the transferred information to decide if the message is spam, and manipulates the conversation if the e-mail message is determined to be spam. For purposes of illustration, assume that spam blocker 18 has an IP address of IP_2 and that the MX resource record associated with D_1 has been changed to point to IP address IP_2 instead of IP_1.

Figure 7:
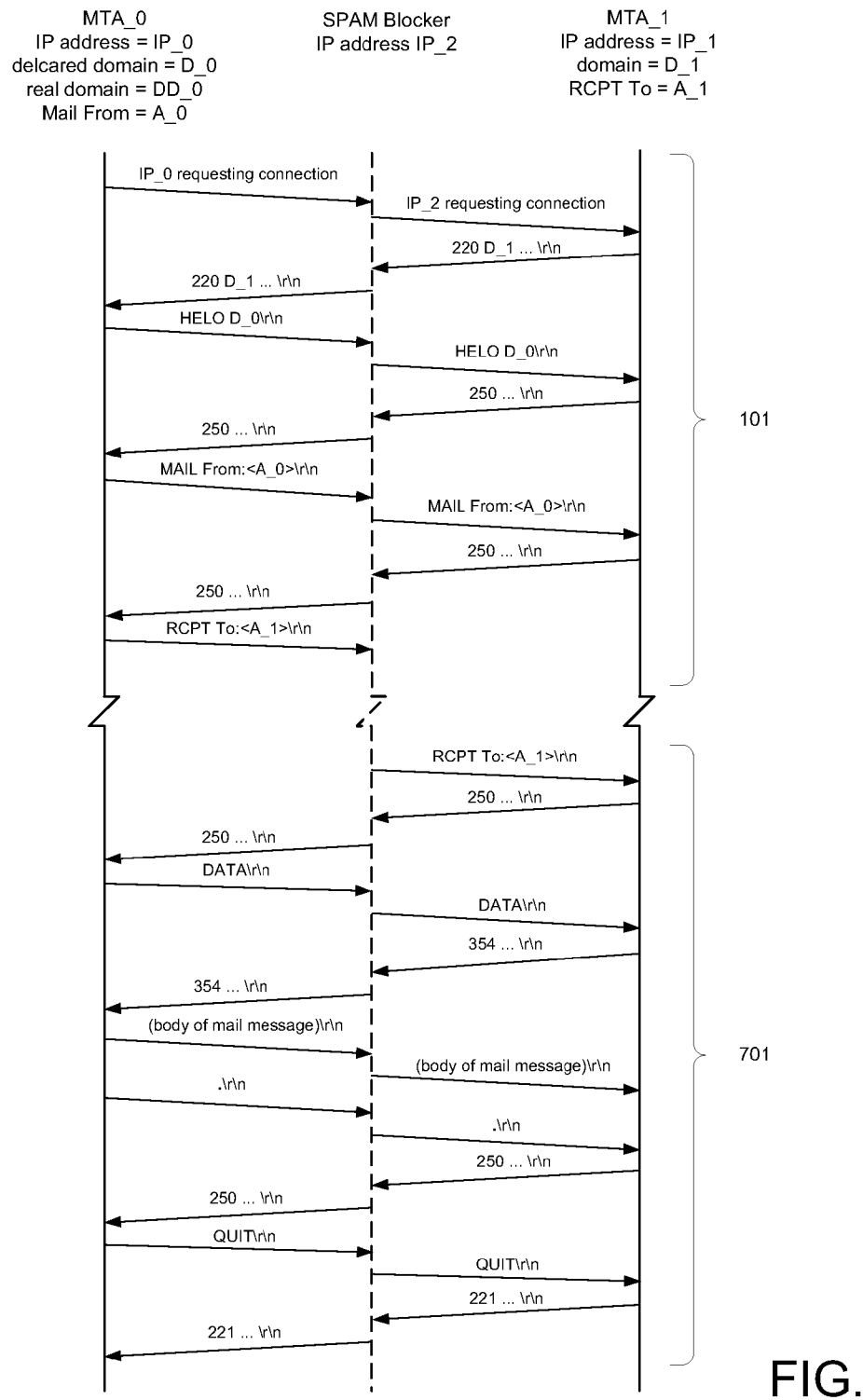
FIG. 7 illustrates the operation of embodiments of the spam blocker when an email message is not suspected of being spam.
Figure 8:
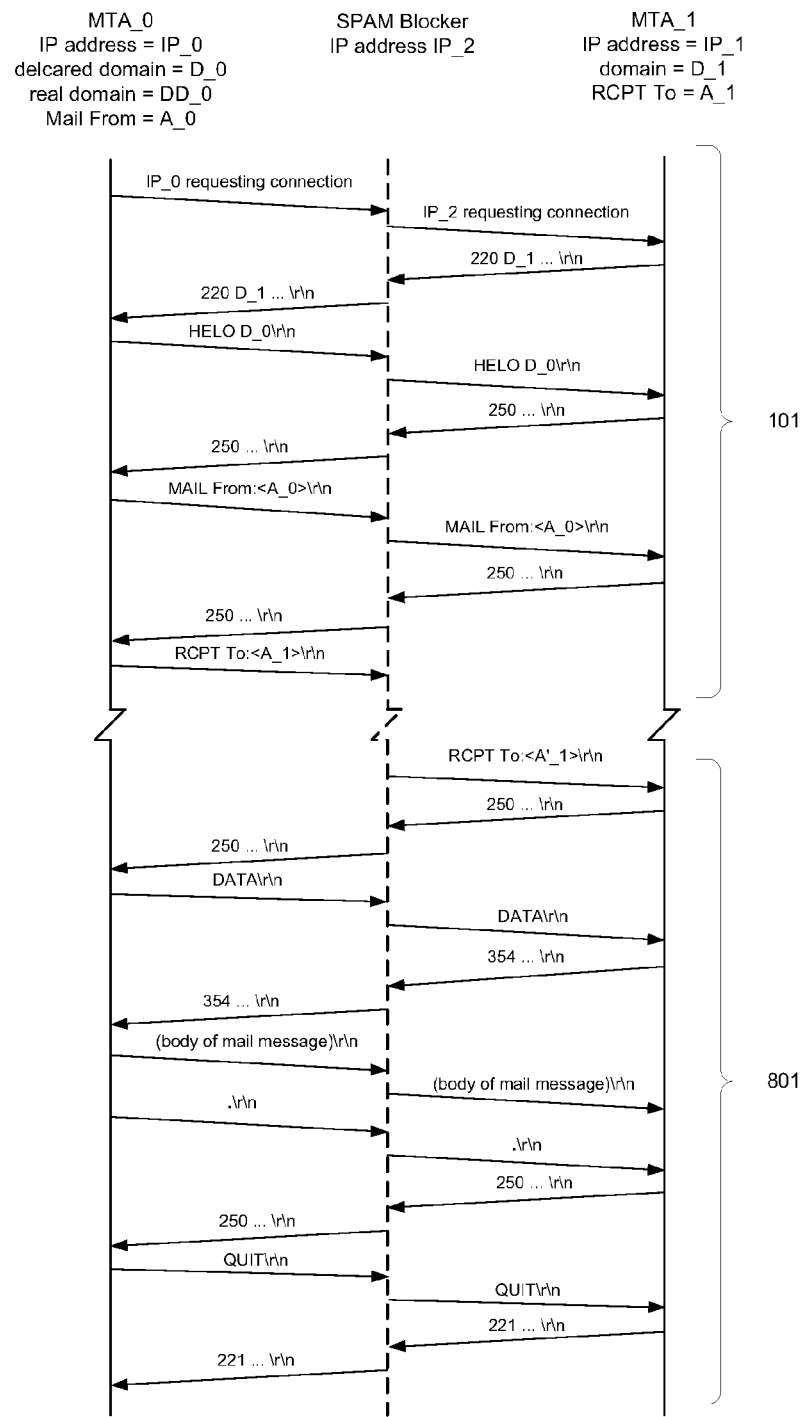
FIG. 8 illustrates the operation of the diverting embodiment of the spam blocker when an email message is suspected of being spam.
Figure 9:
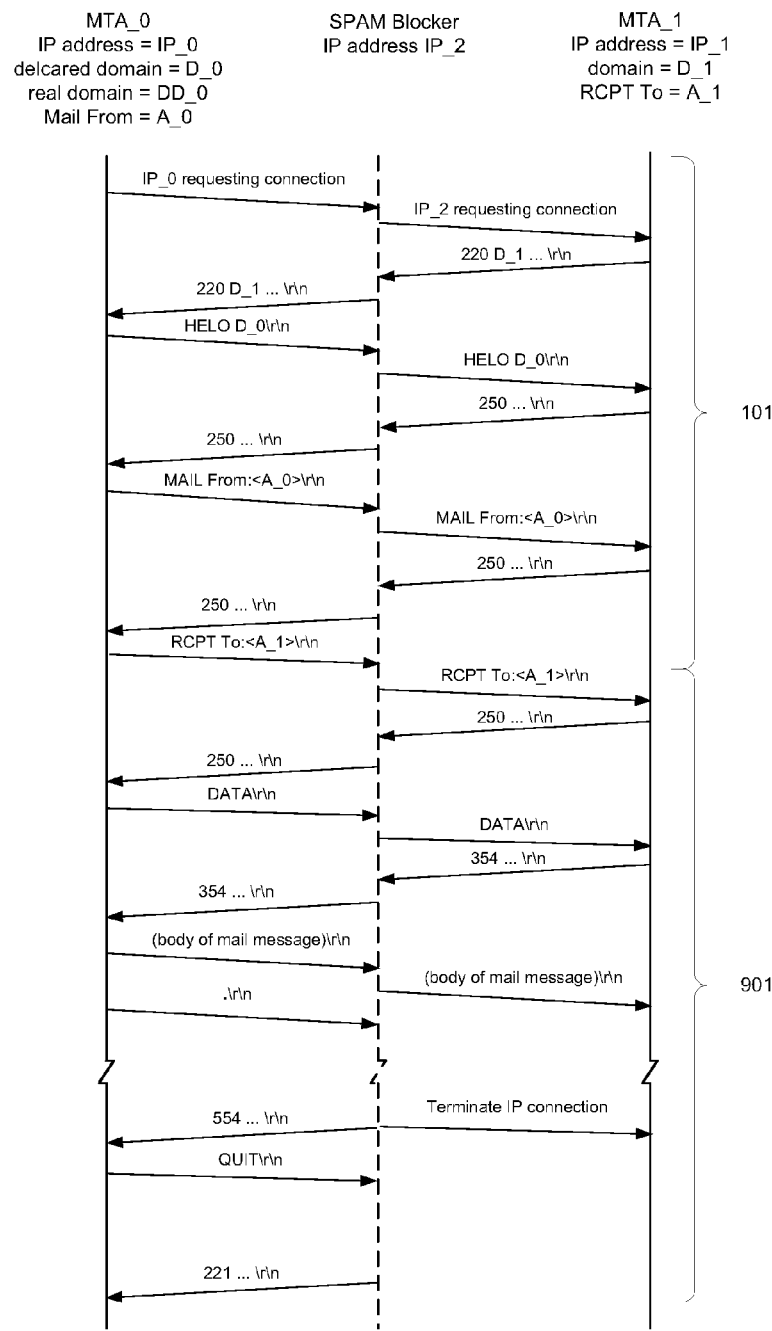
FIG. 9 illustrates the operation of the intercepting embodiment of the spam blocker when an email message is suspected of being spam.
Figure 10:
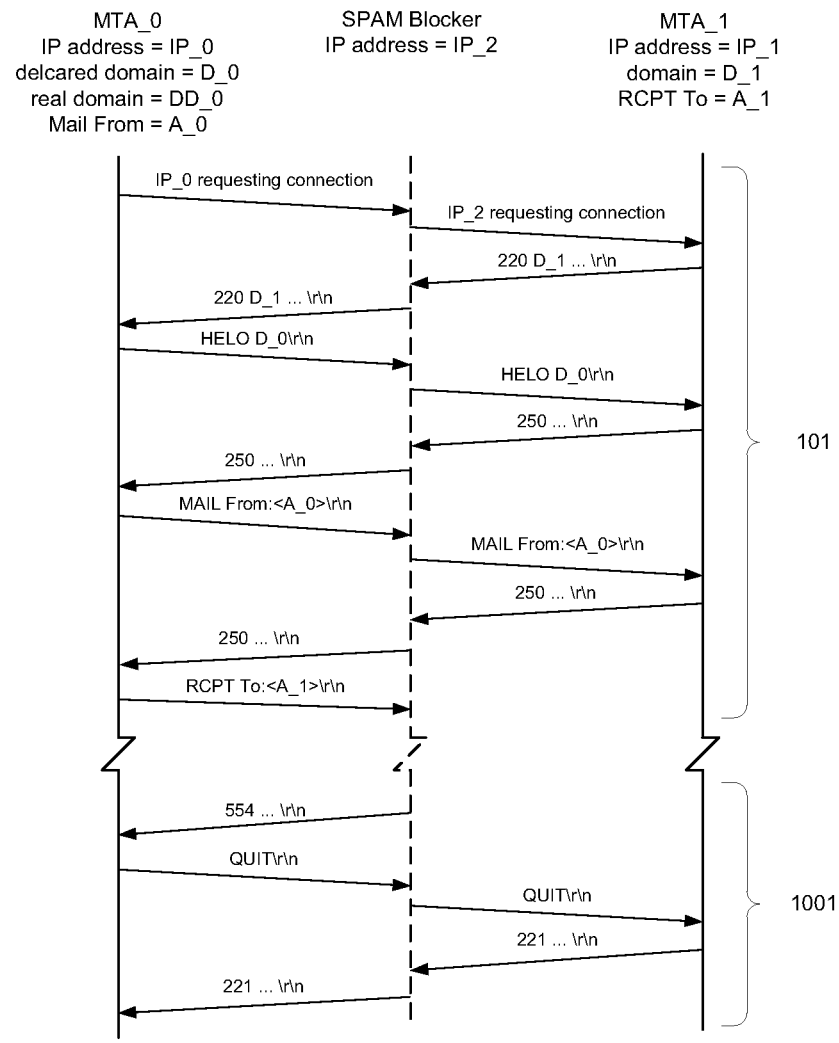
FIG. 10 illustrates the operation of the rejecting embodiment of the spam blocker when an email message is suspected of being spam.

FIGS. 7, 8, 9 and 10 illustrate example timelines between MTA_0, a spam blocker and MTA_1. Specifically, FIG. 7 illustrates the operation of embodiments of the spam blocker when an email message is not suspected of being spam. FIG. 8 illustrates the operation of the diverting embodiment of the spam blocker when an email message is suspected of being spam. FIG. 9 illustrates the operation of the intercepting embodiment of the spam blocker when an email message is suspected of being spam. FIG. 10 illustrates the operation of the rejecting embodiment of the spam blocker when an email message is suspected of being spam.

All four timelines initially share commonalities, shown by bracket 101. First, MTA_0 begins by sending a message to D_1 requesting to establish a connection. The MX resource record directs this request to IP_2. The spam blocker at IP_2 notes the IP address IP_0 of MTA_0, relays this request to MTA_1, and performs various spam determining tests based on IP_0. MTA_1 replies with a 220 acknowledgement reply which includes its domain name D_1. The spam blocker relays this acknowledgement to MTA_0. MTA_0 then sends a HELO command which includes declared domain name of D_0. The spam blocker notes declared domain name D_0, relays this command to MTA_1, and performs various spam determining tests based on D_0. MTA_1 replies with a 250 to acknowledge successful completion of the HELO command. The spam blocker relays this reply to MTA_0. MTA_0 then sends a MAIL command which includes from-address A_0. The spam blocker notes from-address A_0, relays this command to MTA_1, and performs various spam determining tests based on A_0. MTA_1 replies with a 250 to acknowledge successful completion of the MAIL command. The spam blocker relays this reply to MTA_0. MTA_0 then sends a RCPT command which includes to-address A_1. The spam blocker notes A_1 and performs various spam determining tests based on A_1. The spam blocker then evaluates the results of the various spam determining tests to determine whether or not the message is likely to be spam.

In all three embodiments, when a message is not suspected of being spam, the operation is described by the example timeline shown in FIG. 7. Accordingly, the timeline in FIG. 7 continues with the interactions referenced by bracket 701. The spam blocker relays the RCPT command to MTA_1. MTA_1 replies with a 250 to acknowledge successful completion of the RCPT command. The spam blocker relays the 250 reply to MTA_0. MTA_0 then sends a DATA command. The spam blocker relays the DATA command to MTA_1. MTA_1 replies with a 354 to indicate that the mail transfer may begin. The spam blocker relays the 354 to MTA_0. MTA_0 then sends the body of the mail message. The spam blocker relays the body of the mail message to MTA_1. MTA_0 then sends a .\r\n to indicate the end of the message. The spam blocker relays the .\r\n to MTA_1. MTA_1 replies with a 250 to acknowledge receiving the end of message indicator. The spam blocker relays the 250 reply to MTA_0. MTA_0 then sends a QUIT command. The spam blocker relays the QUIT command to MTA_1. MTA_1 replies with a 221 reply to acknowledge the QUIT command and closes down its end of the TCP connection. The spam blocker relays the 221 reply to MTA_0 and closes its end to the TCP connection to MTA_1 and MTA_0. Upon receiving the 221 reply, MTA_0 closes down its end of the TCP connection.

In the diverting embodiment of the spam blocker if the message is suspected of being spam, the operation is described by the example timeline shown in FIG. 8. The process continues by the interactions referenced by bracket 801. The spam blocker looks in a save_spam database (described later for FIG. 30) to see if the user wishes to save the spam. If the user wishes to save the spam then the spam blocker retrieves a diversion address A'_1 corresponding to to-address A_1 from a diversion database (described later for FIG. 31); substitutes the diversion address A'_1 for the to-address A_1 in the RCPT command; and sends the modified RCPT command to MTA_1. MTA_1 replies with a 250 to acknowledge successful completion of the RCPT command. The spam blocker relays the 250 reply to MTA_0. MTA_0 then sends a DATA command. The spam blocker relays the DATA command to MTA_1. MTA_1 replies with a 354 to indicate that the mail transfer may begin. The spam blocker relays the 354 to MTA_0. MTA_0 then sends the body of the mail message. The spam blocker relays the body of the mail message to MTA_1. MTA_0 then sends a .\r\n to indicate the end of the message. The spam blocker relays the .\r\n to MTA_1. MTA_1 replies with a 250 to acknowledge receiving the end of message indicator. The spam blocker relays the 250 reply to MTA_0. MTA_0 then sends a QUIT command. The spam blocker relays the QUIT command to MTA_1. MTA_1 replies with a 221 reply to acknowledge the QUIT command and closes down its end of the TCP connection. The spam blocker relays the 221 reply to MTA_0 and closes down its end of the TCP connection to MTA_1 and MTA_0. Upon receiving the 221 reply, MTA_0 closes down its end of the TCP connection.

The spam blocker looks in the save_spam database to see if the user wishes to save the spam. If the user does not wish to save the spam then the spam blocker sends a 554 error reply to MTA_0. MTA_0 replies to the 554 error reply with a QUIT command. The spam blocker relays the QUIT command to MTA_1. MTA_1 replies with a 221 and closes its end of the TCP connection. The spam blocker relays the 221 reply to MTA_0 and closes down its end of the TCP connections to MTA_1 and MTA_0. Upon receiving the 221 reply MTA_0 closes down its end of the TCP connection.

It should be noted that the diverting embodiment of the spam blocker terminates the connection with MTA_0 before the body of the message is transferred. This saves Internet bandwidth, server-client bandwidth, and local storage.

In the intercepting embodiment of the spam blocker if the message is suspected of being spam, the operation is described by the example timeline shown in FIG. 9. The process continues by the interactions referenced by bracket 901. The spam blocker sends a 554 error reply to MTA_0. Alternatively, a 550 error reply indicative of an unavailable mailbox could be used in place of the 554 error reply indicative of a failed transaction. The spam blocker closes down the TCP connection with MTA_1. MTA_1 should discard the incomplete transmission.

In the rejecting embodiment of the spam blocker if the message is suspected of being spam, the operation is described by the example timeline shown in FIG. 10. The process continues by the interactions referenced by bracket 1001. The spam blocker sends a 554 error reply to MTA_0. Alternatively, a 550 error reply indicative of an unavailable mailbox could be used in place of the 554 error reply indicative of a failed transaction. MTA_0 replies to the 554 error reply with a QUIT command. The spam blocker relays the QUIT command to MTA_1. MTA_1 replies with a 221 and closes its end of the TCP connection. The spam blocker relays the 221 reply to MTA_0 and closes down its end of the TCP connections to MTA_1 and MTA_0. Upon receiving the 221 reply MTA_0 closes down its end of the TCP connection.

It should be noted that the rejecting embodiment of the spam blocker terminates the connection with MTA_0 before the body of the message is transferred. Hence, this embodiment also saves Internet bandwidth, server-client bandwidth, and local storage.

It should be noted that in all three embodiments when the email message is determined not to be spam, the interactions between MTA_0 and MTA_1 as shown in FIG. 7 are functionally equivalent to the normal interactions between MTA_0 and MTA_1 as shown in FIG. 3. This improves compatibility. It should be noted that until receipt of the RCPT command by the spam blocker, MTA_1 has full control of the replies to MTA_0's commands. This also improves compatibility.

Figure 11A:
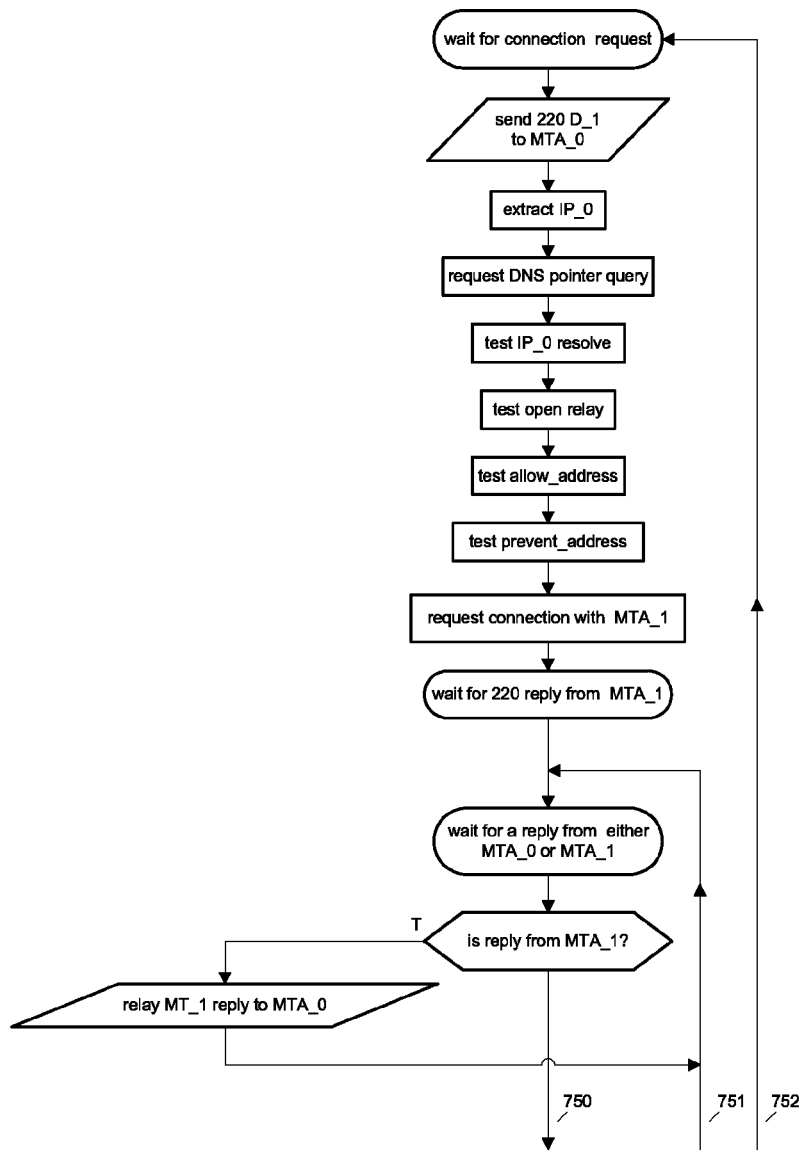
FIGS. 11A, 11B, 11C, 11D, 11E and 11F comprise a flowchart illustrating the algorithm which implements the diverting embodiment of the spam blocker.
Figure 11B:
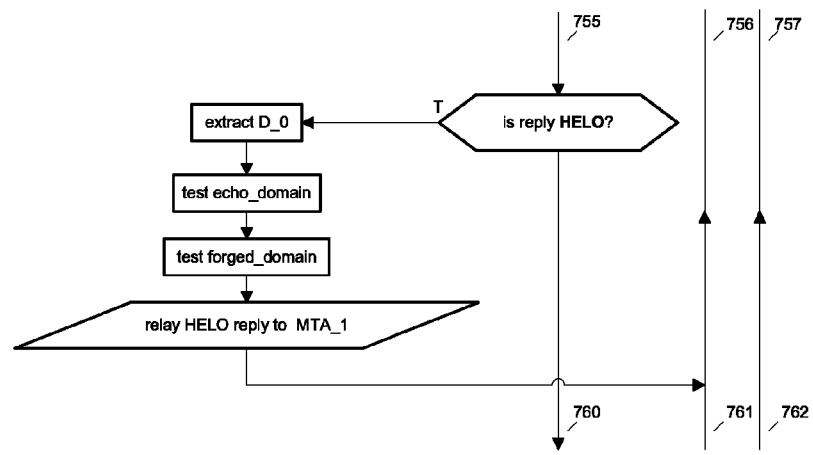
Figure 11C:
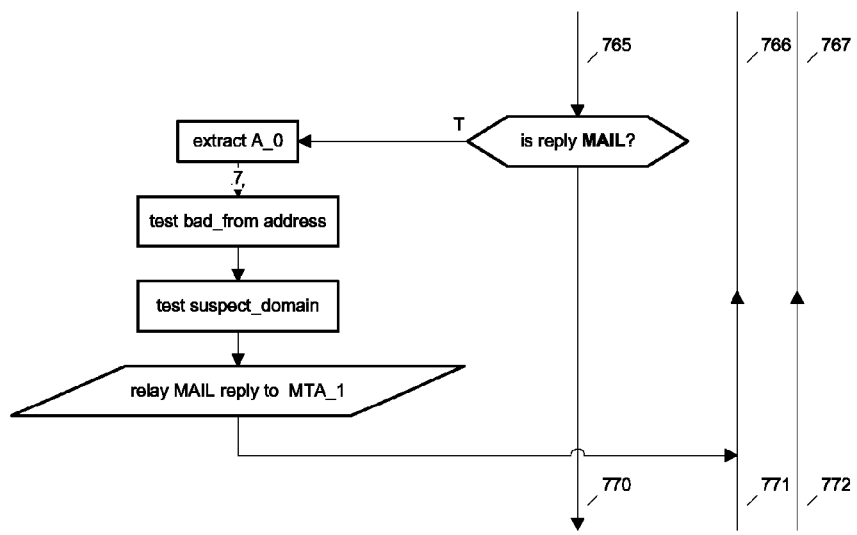
Figure 11D:
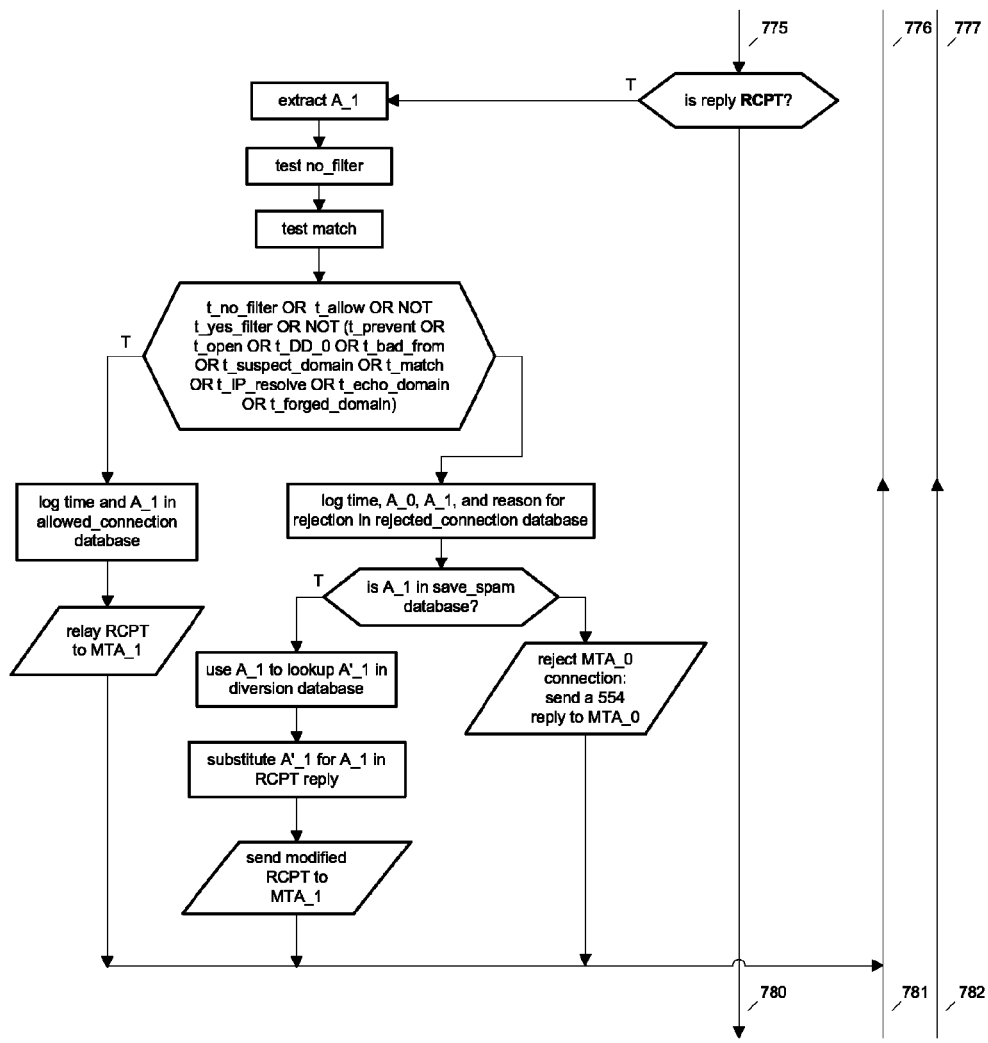
Figure 11E:
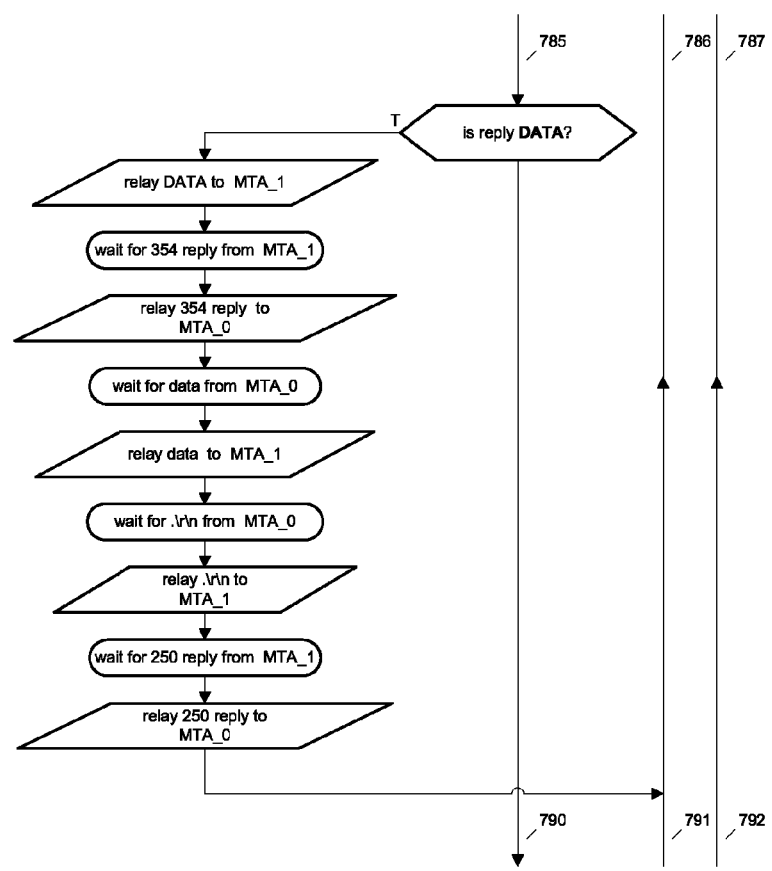

FIGS. 11A, 11B, 11C, 11D, 11E and 11F comprise a flowchart illustrating the algorithm which implements the diverting embodiment of the spam blocker. Connections 750, 751, and 752 in FIG. 11A are respectively connected to connections 755, 756, and 757 in FIG. 11B. Connections 760, 761, and 762 in FIG. 11B are respectively connected to connections 765, 766, and 767 in FIG. 11C. Connections 770, 771, and 772 in FIG. 11C are respectively connected to connections 775, 776, and 777 in FIG. 11D. Connections 780, 781, and 782 in FIG. 11D are respectively connected to connections 785, 786, 787 in FIG. 11E. Connections 790, 791, and 792 in FIG. 11E are respectively connected to connections 795, 796, and 797 in FIG. 11F. These connections are used to show the process flow between different pages of the flowchart and are used only for clarity.

The algorithm begins in FIG. 11A by waiting for a connection establishment request. Upon receipt of such a request the spam blocker extracts MTA_0's IP address IP_0. The spam blocker then sends a 220 reply with a D_1 domain name to MTA_0. The spam blocker then requests a domain name server (DNS) pointer query. Depending on the variant of the diverting embodiment of the spam blocker implemented, the spam blocker can perform an IP resolve test, an open relay test, an allow address test, and/or a prevent address test. For the sake of clarity, the flowchart shows an embodiment which uses all four tests. Furthermore, all optional tests are included in the flowchart as well, but may be omitted. The spam blocker then requests a connection with MTA_1 and waits for a 220 reply from MTA_1. It then waits for a reply from either MTA_0 or MTA_1. It should be noted that IP_0 is an important address since it cannot be forged. If IP_0 is forged then the 220 reply will not be sent to MTA_0's correct IP address, MTA_0 will not receive the 220 reply, and the requested connection will not be established.

If the reply is from MTA_1 it relays the reply to MTA_0 and waits for a new reply.

If the reply is a HELO command as shown in FIG. 11B then the spam blocker extracts MTA_0's declared domain D_0. The spam blocker can optionally perform an echo domain test and/or a forged domain test. It then relays the HELO reply to MTA_1 and waits for another reply. It should be noted that for the extended SMTP protocol an EHLO command and reply can take the place of a HELO command and reply. For the sake of clarity, the operation is described in terms of the HELO command, but it should be understood that this approach applies equally in the event of an EHLO command.

If the reply is a MAIL command as shown in FIG. 11C then the spam blocker extracts from-address A_0. The spam blocker can optionally perform a bad from test and/or a suspect domain test. It then relays the MAIL command to MTA_1 and waits for another reply.

If the reply is a RCPT command as shown in FIG. 11D then the spam blocker extracts to-address A_1. The spam blocker then optionally can perform a "no filter" test, a "yes filter" test, and a "to from" test. It then uses the results of the various tests to determine if the message is suspected of being spam. In this version of the algorithm the decision equation used is t_allow OR t_no_filter OR NOT t_yes_filter OR NOT (t_prevent OR t_open_relay OR t_IP_resolve OR t_bad_from OR t_suspect_domain OR t_to_from OR t_echo_domain OR t_forged_domain), where t_allow is the result of the allow test, t_no_filter is the result of the no filter test, t_yes_filter is the result of the yes filter test, t_prevent is the result of the prevent address test, t_open_relay is the result of the open relay test, t_IP_resolve is the result of the IP resolve test, t_bad_from is the result of the bad from test, t_suspect_domain is the result of the suspect domain test, t_to_from is the result of the to from test, t_echo domain is the result of the echo domain test, t_forged_domain is the result of the forged domain test. In the event a test is not used, the result is simply omitted from the decision equation.

If the decision equation is determined to be true then the message is allowed and the time and to-address is entered in the allowed_connection database (described further for FIG. 28 below). It then relays the RCPT command to MTA_1 and waits for a new reply.

If the decision equation is determined to be false and the to-address A_1 is not in the save_spam database then the message is not allowed and the time, from-address A_0, to-address A_1, and a reason for the rejection is entered into a rejected_connection database (described further for FIG. 29 below).

The spam blocker then rejects the MTA_0 connection by sending a 554 error reply to MTA_0, and waits for a new reply. If the decision equation is determined to be false and the to-address A_1 is in the save_spam database then the message is not allowed and the time, from-address A_0, to-address A_1, and a reason for the rejection is entered into a rejected_ connection database. The spam blocker then looks up the diversion address A'_1 in the diversion database, substitutes A'_1 for A_1 in the RCPT command, and sends the modified RCPT command to MTA_1, and waits for a new reply.

If the reply is a DATA command as shown in FIG. 11E then the spam blocker relays the DATA command to MTA_1, waits for a 354 reply form MTA_1, and relays the 354 reply to MTA_0. It then waits for data from MTA_0, relays this data to MTA_1, waits for a .\r\n end of data indicator from MTA_0, relays the .\r\n to MTA_1, waits for a 250 reply from MTA_1 to acknowledge the successful transfer of the data, and then relays the 250 reply to MTA_0 and waits for a new reply.

Figure 11F:
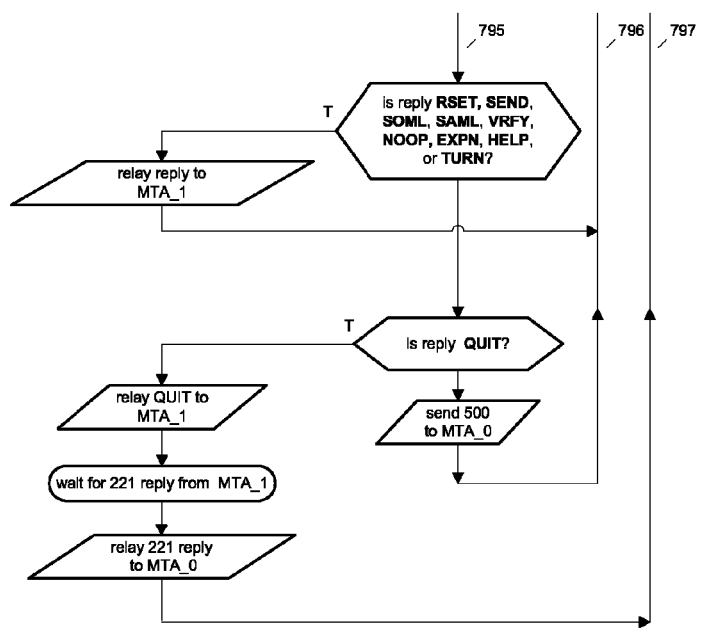

If the reply is a RSET, SEND, SOML, SAML, VRFY, NOOP, EXPN, HELP, or TURN command as shown in FIG. 11F then the spam blocker relays the reply to MTA_1 and waits for a new reply.

If the reply is a QUIT command as shown in FIG. 11F then the spam blocker relays the QUIT command to MTA_1, waits for a 221 reply from MTA_1 to acknowledge the QUIT command, relays the 221 reply to MTA_0, closes its end of the TCP connection with both MTA_1 and MTA_0, and then waits for a new connection request.

If the reply is not a QUIT command then no valid command was received so the spam blocker sends a 500 to MTA_0 and waits for a new reply.

Figure 12A:
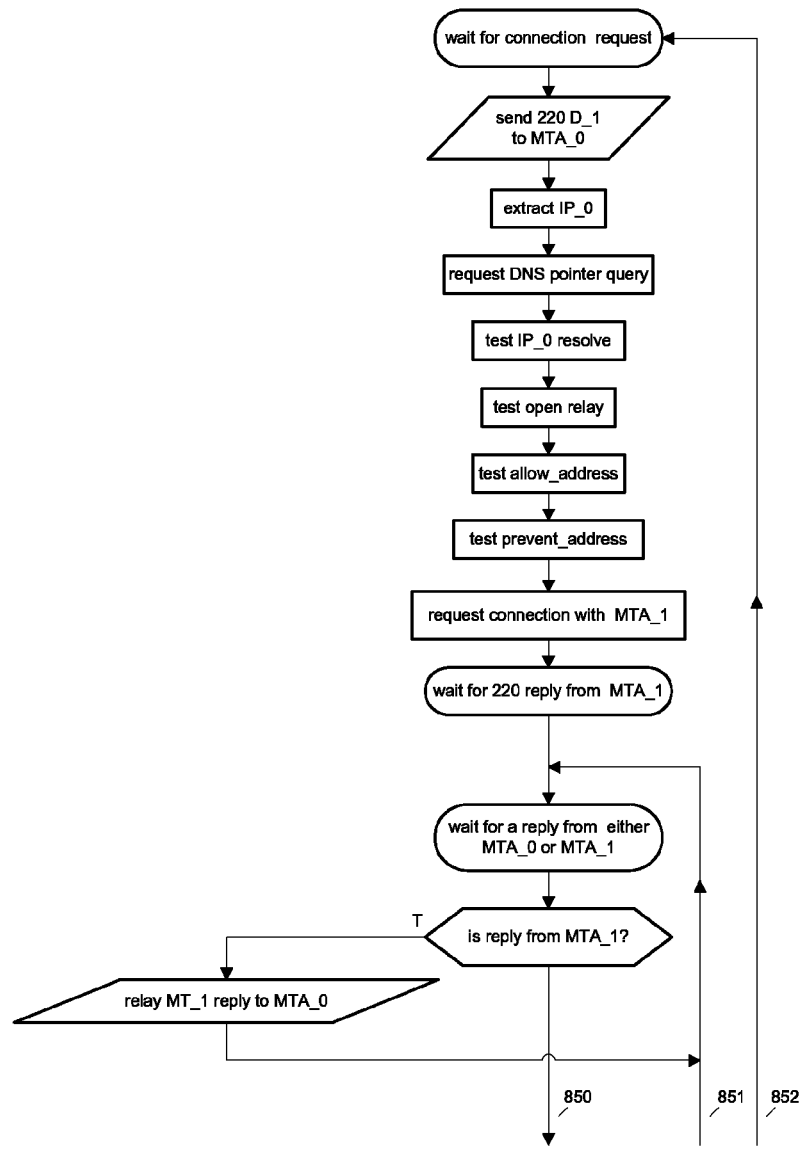
FIGS. 12A, 12B, 12C, 12D and 12E comprise a flowchart illustrating the algorithm which implements the diverting embodiment of the spam blocker.
Figure 12B:
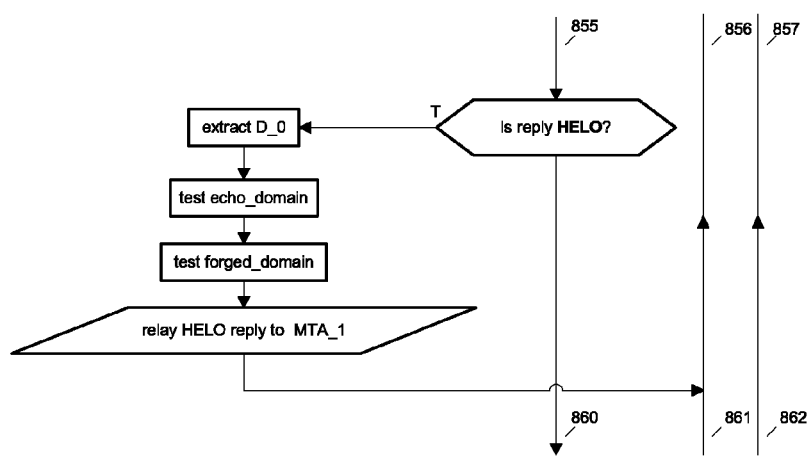
Figure 12C:
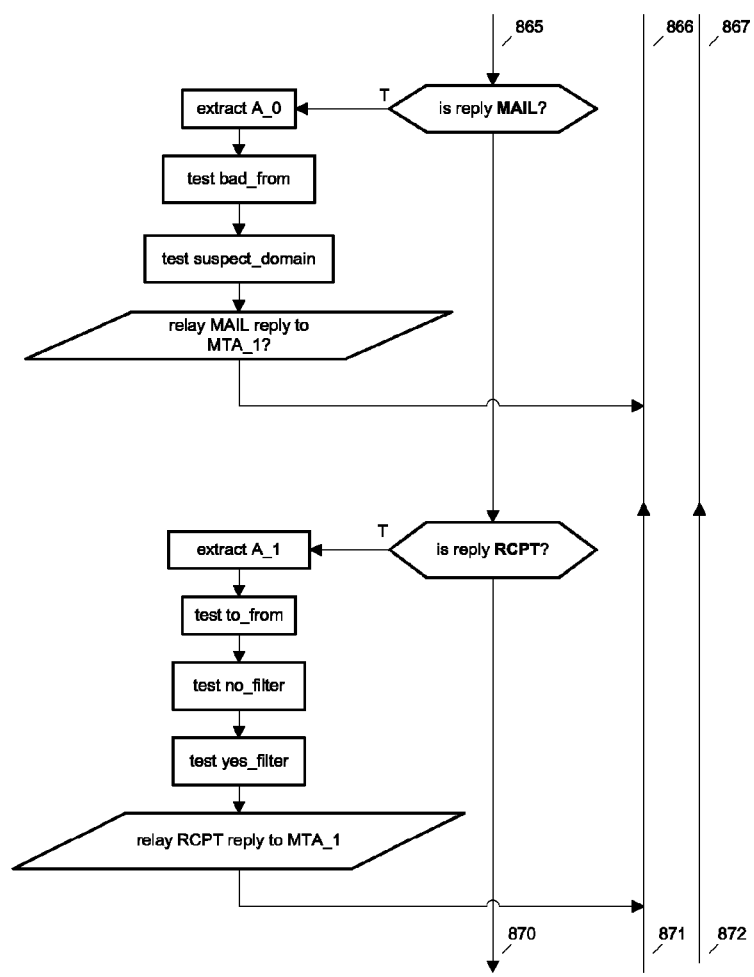
Figure 12D:
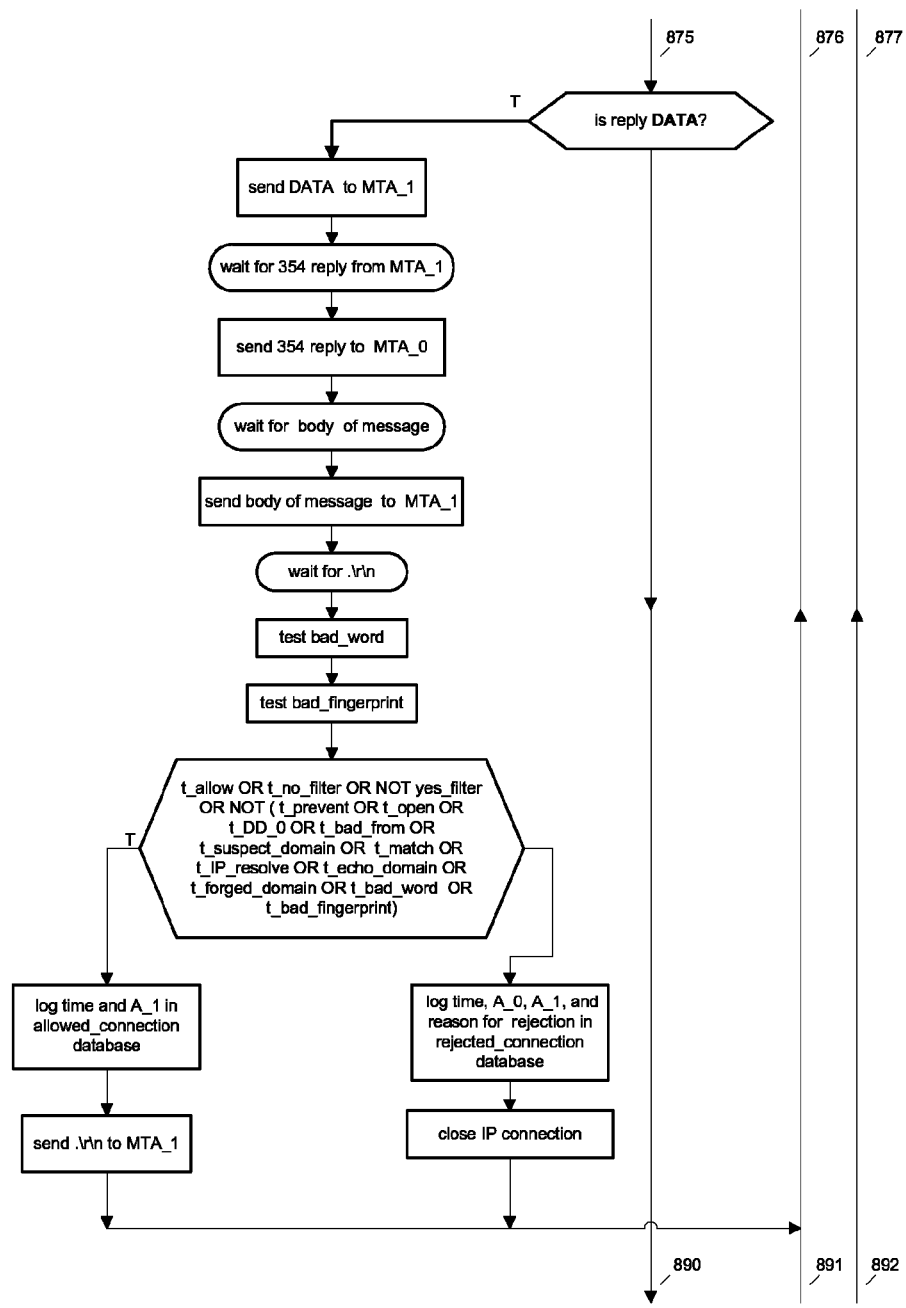

FIGS. 12A, 12B, 12C, 12D and 12E comprise a flowchart illustrating the algorithm which implements the intercepting embodiment of the spam blocker. Connections 850, 851, and 852 in FIG. 12A are respectively connected to connections 855, 856, and 857 in FIG. 12B. Connections 860, 861, and 862 in FIG. 12B are respectively connected to connections 865, 866, and 867 in FIG. 12C. Connections 870, 871, and 872 in FIG. 12C are respectively connected to connections 875, 876, and 877 in FIG. 12D. Connections 890, 891, and 892 in FIG. 12D are respectively connected to connections 895, 896, and 897 in FIG. 12E. As described above, these connections are used to show the process flow between different pages of the flowchart and are used only for clarity.

The algorithm begins in FIG. 12A by waiting for a connection establishment request. Upon receipt of such a request the spam blocker extracts MTA_0's IP address IP_0. The spam blocker then sends a 220 reply with a D_1 domain name to MTA_0. The spam blocker then requests a domain name server (DNS) pointer query. Depending on the variant of the intercepting embodiment of the spam blocker implemented, the spam blocker can perform an IP resolve test, an open relay test, an allow address test, and/or a prevent address test. For the sake of clarity, the flowchart shows an embodiment which uses all four tests. Furthermore, all optional tests are included in the flowchart as well, but may be omitted. The spam blocker then requests a connection with MTA_1 and waits for a 220 reply from MTA_1. The spam blocker then waits for a reply from either MTA_0 or MTA_1. It should be noted that IP_0 is an important address since it cannot be forged. If IP_0 is forged then MTA_0 will not receive the 220 reply and the requested connection cannot be established.

If the reply is from MTA_1 it relays the reply to MTA_0 and waits for another reply.

If the reply is a HELO command as shown in FIG. 12B then the spam blocker extracts MTA_0's declared domain D_0. The spam blocker can optionally perform an echo domain test and/or a forged domain test. It then relays the HELO reply to MTA_1 and waits for another reply.

If the reply is a MAIL command as shown in FIG. 12C then the spam blocker extracts from-address A_0. The spam blocker can optionally perform a bad from test and/or a suspect domain test. It then relays the MAIL command to MTA_1 and waits for another reply.

If the reply is a RCPT command as shown in FIG. 12C then the spam blocker extracts to-address A_1 The spam blocker then optionally can perform a "no filter" test, a "yes filter" test, and a "to from" test. It then relays the RCPT command to MTA_1 and waits for another reply.

If the reply is a DATA command as shown in FIG. 12D the spam blocker sends the DATA command to MTA_1, waits for a 354 reply from MTA_1, relays the 354 reply to MTA_0, waits for the body of the message, relays the body of the message to MTA_1, and waits for .\r\n end-of-message indicator from MTA_0. The spam blocker can optionally perform a bad word test and the bad fingerprint test on the body of the message. It then uses the results of the various tests to determine if the message is suspected of being spam. In this version of the algorithm the decision equation used is t_allow OR t_no_filter OR NOT t_yes_filter OR NOT (t_prevent OR t_open_relay OR t_IP_resolve OR t_bad_from OR t_suspect_domain OR t_to_from OR t_echo_domain OR t_forged_domain OR t bad word OR t_bad_fingerprint), where t_allow is the result of the allow test, t_no_filter is the result of the no filter test, t_yes_filter is the result of the yes filter test, t_prevent is the result of the prevent address test, t_open_relay is the result of the open relay test, t_IP_resolve is the result of the IP resolve test, t_bad_from is the result of the bad from test, t_suspect_domain is the result of the suspect domain test, t_to_from is the result of the to from test, t_echo domain is the result of the echo domain test, t_forged_domain is the result of the forged domain test, t_bad_word is the result of the bad word test and t_bad_fingerprint is the result of the bad fingerprint test. Once again in the event a test is not used, the result is simply omitted from the decision equation.

If the decision equation is true then the message is allowed and the time and to-address is logged in the allowed_connection database. It then relays the .\r\n end-of-message indicator to MTA_1 and waits for a new reply.

If the decision equation is determined to be false then the message is not allowed and the time, from-address A_0, to-address A_1, and a reason for the rejection are logged in a rejected_connection database. The spam blocker then sends a 554 error reply to MTA_0 and waits for a new reply and terminates the TCP connection to MTA_1.

Figure 12E:
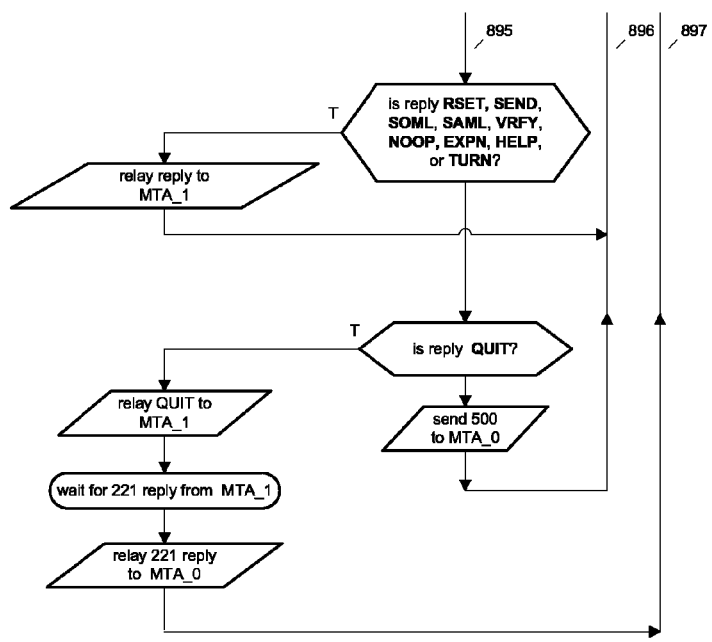

If the reply is a RSET, SEND, SOML, SAML, VRFY, NOOP, EXPN, HELP, or TURN command as shown in FIG. 12E then the spam blocker relays the reply to MTA_1 and waits for a new reply.

If the reply is a QUIT command as shown in FIG. 12E then the spam blocker relays the QUIT command to MTA_1, waits for a 221 reply from MTA_1 to acknowledge the QUIT command, and relays the 221 reply to MTA_0. It then closes down its end of the TCP connection with both MTA_1 and MTA_0 and waits for a new connection request.

If the reply is not a QUIT command then no valid command was received so the spam blocker sends a 500 to MTA_0 and waits for a new reply.

Figure 13A:
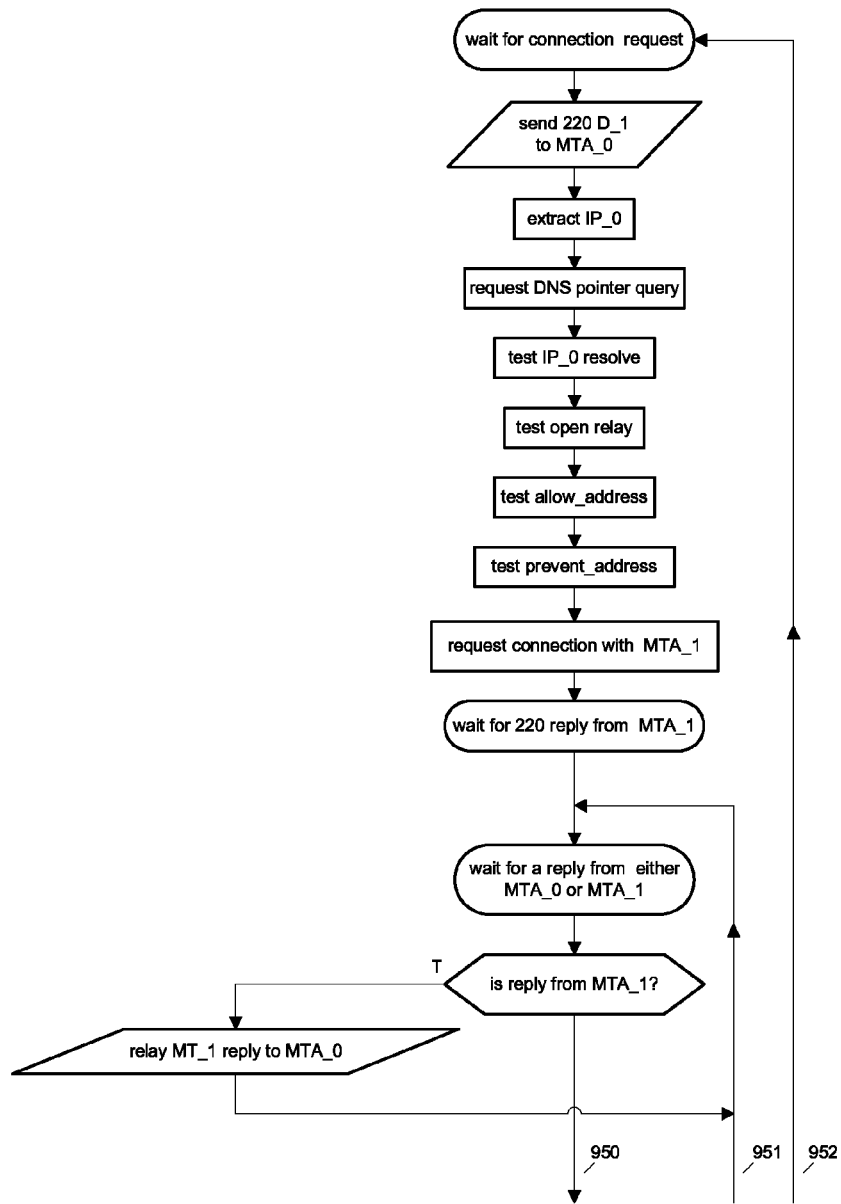
FIGS. 13A, 13B, 13C, 13D, 13E and 13F comprise a flowchart illustrating the algorithm which implements the diverting embodiment of the spam blocker.
Figure 13B:
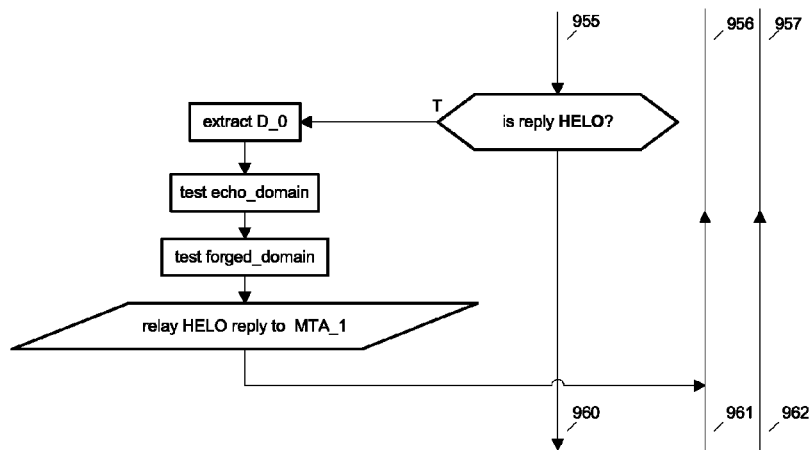
Figure 13C:
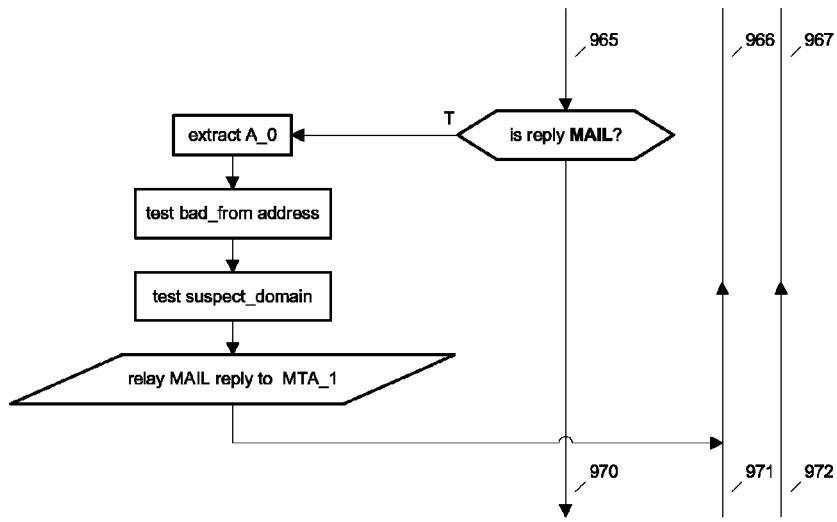
Figure 13D:
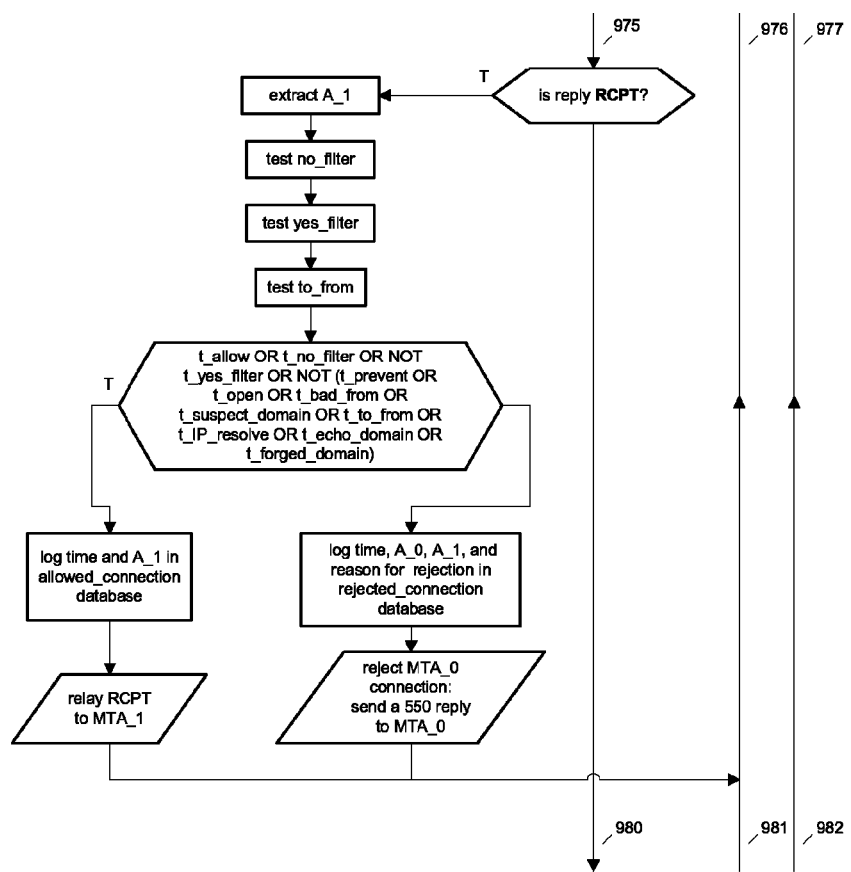
Figure 13E:
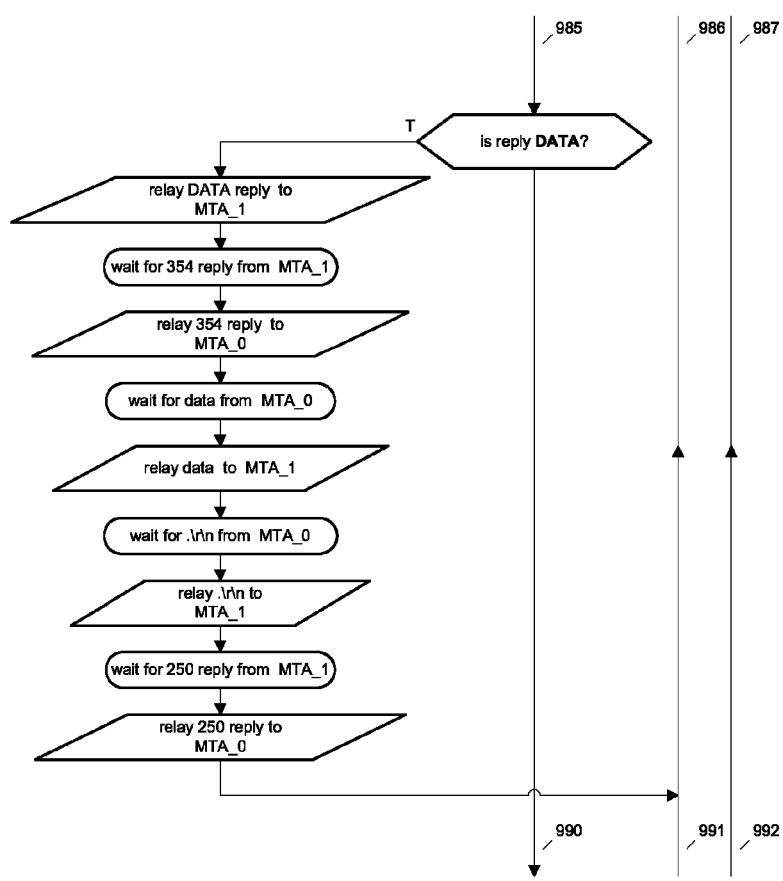

FIGS. 13A, 13B, 13C, 13D, 13E and 13F comprise a flowchart illustrating the algorithm which implements the diverting embodiment of the spam blocker. Connections 950, 951, and 952 in FIG. 13A are respectively connected to connections 955, 956, and 957 in FIG. 13B. Connections 960, 961, and 962 in FIG. 13B are respectively connected to connections 965, 966, and 967 in FIG. 13C. Connections 970, 971, and 972 in FIG. 13C are respectively connected to connections 975, 976, and 977 in FIG. 13D. Connections 980, 981, and 982 in FIG. 13D are respectively connected to connections 985, 986, and 987 in FIG. 13E. Connections 990, 991, and 992 in FIG. 13E are respectively connected to connections 995, 996, and 997 in FIG. 13F. As described above, these connections are used to show the process flow between different pages of the flowchart and are used only for clarity.

The algorithm begins in FIG. 13A by waiting for a connection establishment request. Upon receipt of such a request the spam blocker extracts MTA_0's IP address IP_0. The spam blocker then sends a 220 reply with a D_1 domain name to MTA_0. The spam blocker then requests a domain name server (DNS) pointer query. Depending on the variant of the rejecting embodiment of the spam blocker implemented, the spam blocker can perform an IP resolve test, an open relay test, an allow address test, and/or a prevent address test. Once again, for the sake of clarity, the flowchart shows an embodiment which uses all four tests. Furthermore, all optional tests are included in the flowchart as well, but may be omitted. The spam blocker then requests a connection with MTA_1 and waits for a 220 reply from MTA_1. The spam blocker then waits for a reply from either MTA_0 or MTA_1. It should be noted that IP_0 is an important address since it cannot be forged. If IP_0 is forged then the 220 reply will not be sent to MTA_0's real IP address, MTA_0 will not receive the 220 reply, and the requested connection will not be established.

If the reply is from MTA_1 it relays the reply to MTA_0 and waits for another reply.

If the reply is a HELO command as shown in FIG. 13B then the spam blocker extracts MTA_0's declared domain D_0. The spam blocker can optionally perform an echo domain test and/or a forged domain test. It then relays the HELO reply to MTA_1 and waits for another reply.

If the reply is a MAIL command as shown in FIG. 13C then the spam blocker extracts from-address A_0. The spam blocker can optionally perform a bad from test and/or a suspect domain test. It then relays the MAIL command to MTA_1 and waits for another reply.

If the reply is a RCPT command as shown in FIG. 13D then the spam blocker extracts to-address A_1. The spam blocker then optionally can perform a "no filter" test, a "yes filter" test, and a "to from" test. It then uses the results of the various tests to determine if the message is suspected of being spam.

In this version of the algorithm the decision equation used is t_allow OR t_no_filter OR NOT t_yes_filter OR NOT (t_prevent OR t_open_relay OR t_IP_resolve OR t_bad_from OR t_suspect_domain OR t_to_from OR t_echo_domain OR t_forged_domain), where t_allow is the result of the allow test, t_no_filter is the result of the no filter test, t_yes_filter is the result of the yes filter test, t_prevent is the result of the prevent address test, t_open_relay is the result of the open relay test, t_IP_resolve is the result of the IP resolve test, t_bad_from is the result of the bad from test, t_suspect_domain is the result of the suspect domain test, t_to_from is the result of the to from test, t_echo domain is the result of the echo domain test, and t_forged_domain is the result of the forged domain test. Once again in the event a test is not used, the result is simply omitted from the decision equation.

If the decision equation is determined to be true then the message is allowed and the time and to-address is entered in the allowed_connection database. The from-address A_0 could be included if privacy issues are not of concern. It then relays the RCPT command to MTA_1 and waits for a new reply.

If the decision equation is determined to be false then the message is not allowed and the time, from-address A_0, to-address A_1, and a reason for the rejection is entered into a rejected_connection database. The spam blocker then rejects the MTA_0 connection by sending a 554 error reply to MTA_0 and waits for a new reply.

If the reply is a DATA command as shown in FIG. 13E then the spam blocker relays the DATA command to MTA_1, waits for a 354 reply form MTA_1, and relays the 354 reply to MTA_0. It then waits for data from MTA_0, relays this data to MTA_1, waits for a .\r\n end of message indicator from MTA_0, relays the .\r\n to MTA_1, waits for a 250 reply from MTA_1 to acknowledge the successful transfer of the data, and then relays the 250 reply to MTA_0 and waits for a new reply.

Figure 13F:
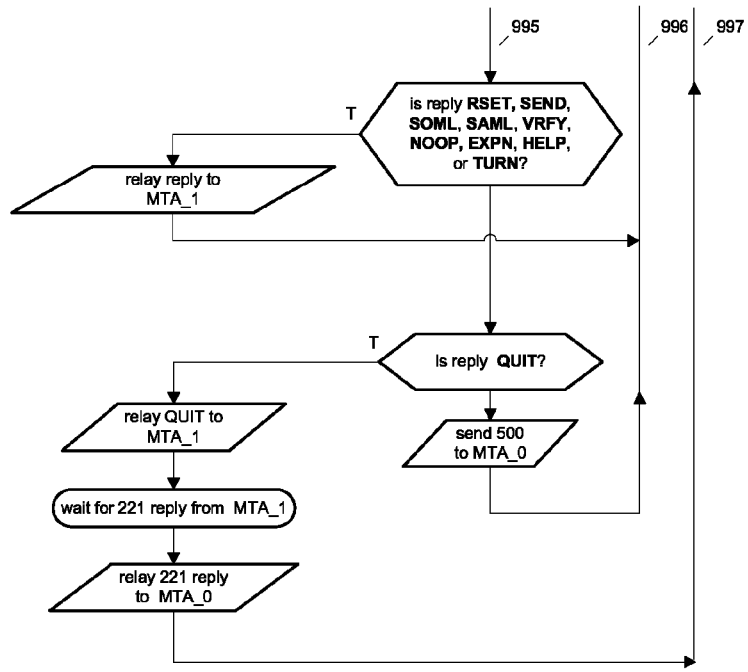

If the reply is a RSET, SEND, SOML, SAML, VRFY, NOOP, EXPN, HELP, or TURN command as shown in FIG. 13F then the spam blocker relays the command to MTA_1 and waits for a new reply.

If the reply is a QUIT command as shown in FIG. 13F then the spam blocker relays the QUIT command to MTA_1, waits for a 221 reply from MTA_1 to acknowledge the QUIT command, relays the 221 reply to MTA_0, closes down its end of the TCP connection with both MTA_1 and MTA_0, and waits for a new connection request.

If the reply is not a QUIT command then no valid command was received so the spam blocker sends a 500 to MTA_0 and waits for a new reply.

Figure 14:
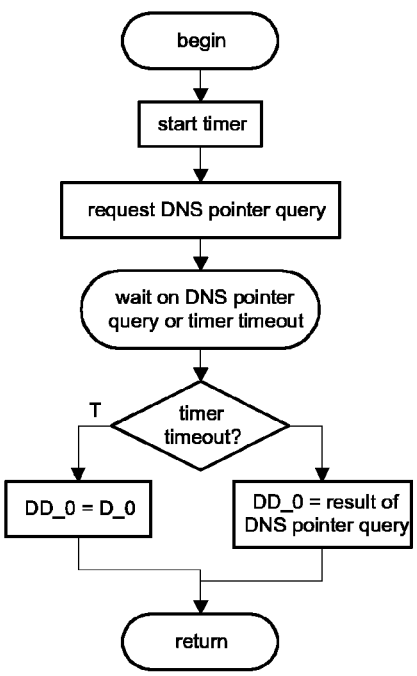
FIG. 14 is a flowchart illustrating an exemplary method for requesting the domain name server (DNS) pointer record.

FIG. 14 is a flowchart illustrating an exemplary method for requesting the domain name server (DNS) pointer record used in FIG. 11B, FIG. 12A and FIG. 13B. First, a timer is started. The method then sends out a pointer query to a DNS server to fetch the domain name associated with IP_0. It then waits for either a reply or timer time out. If the timer times out then the real domain DD_0 is set to the declared domain D_0. In the alternative, the real domain DD_0 could be set to "unavailable." If the DNS server replies with a domain name and the timer did not time out then the real domain DD_0 is set to the returned domain name. If the DNS reply indicates that it does not have a domain name associated with IP_0 and the timer did not time out then the real domain DD_0 is set to "no name." Since the declared domain can be forged, it may also be desirable to check the declared domain D_0 for its legitimacy. One method is to resolve the declared domain in order to see if an IP address corresponding to the declared domain exists. Furthermore, a more stringent criterion for legitimacy is to check to see if the declared domain resolves to IP_0. Additionally, most DNS query mechanisms have built in timeout mechanism, so the method described here can implicitly set a timer based by using built in timing mechanisms supplied by the operating system or system libraries as part of their DNS resolver.

Figures 15, 16:
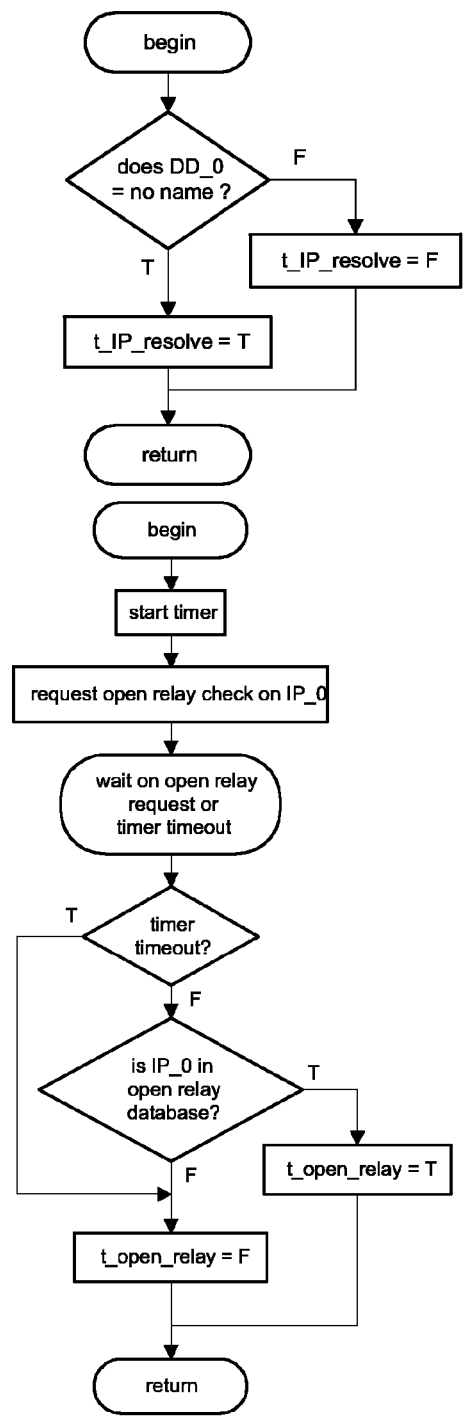
FIG. 15 is a flowchart illustrating an exemplary method for performing the IP resolve test.
FIG. 16 is a flowchart illustrating an exemplary method for performing the open relay test.

FIG. 15 is a flowchart illustrating an exemplary method for performing the IP resolve test used in FIG. 11B, FIG. 12A, and FIG. 13B. If real domain name DD_0 is "no name" then set flag t_IP_resolve to true, else set flag t_IP_resolve to false. This test is based on the fact that some spammers try to hide their domain name and do not enter a domain name in the DNS database. In the event real domain name DD_0 is "unavailable" then flag t_IP_resolve can be set either to true or false depending on the desired option set by the end user. An unavailable name due to a time out can be the result of misconfiguration or network issues or can be the result of an offshore DNS service, the latter often is indicative of an illegitimate sender of e-mail messages. Whether to accept unavailable IP names is a tradeoff between stopping spam and admitting false positives.

Figure 1:
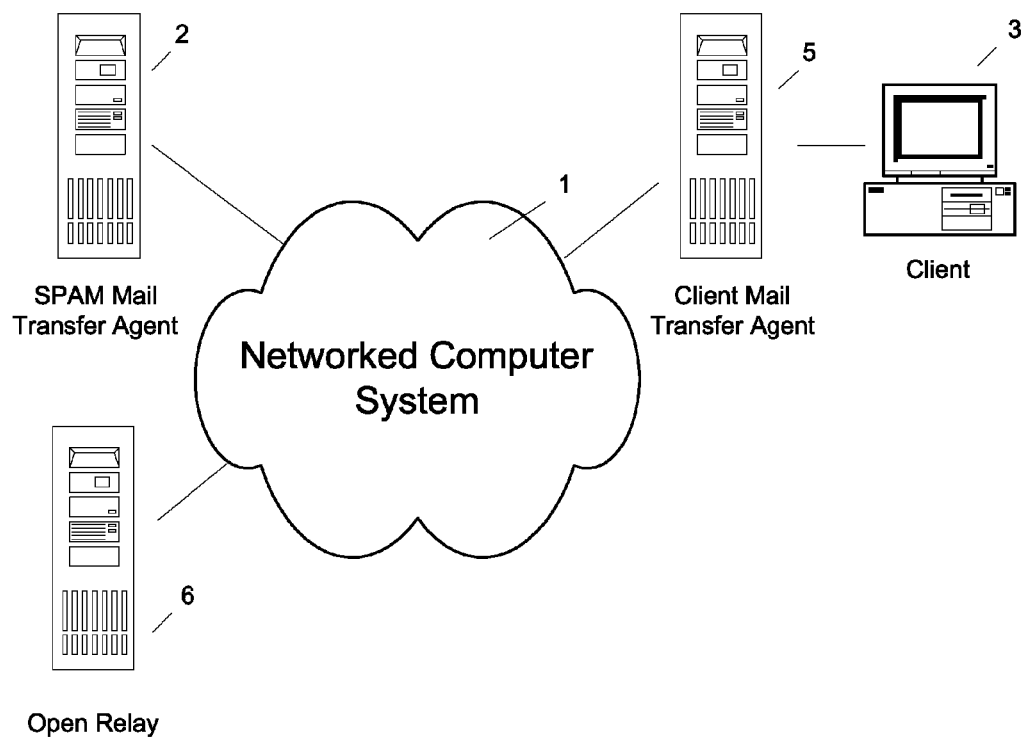
FIG. 1 (prior art) shows an overview block diagram of a networked computer system consisting of a network 1, a client, a transmitting message transfer agent 2, a receiving message transfer agent 5, and a open relay message transfer agent 6.

FIG. 16 is a flowchart illustrating an exemplary method for performing the open relay test used in FIG. 11B, FIG. 12A and FIG. 13B. The method begins by starting a timer and then checking to see if IP_0 is in an open relay database, such as http://www.relays.ordb.org or http://www.relays.orisrusoft.com. These databases are now defunct however new databases have taken their place and have expanded the functionality beyond simply listing open relays to a more comprehensive mail blacklist such as http://www.aspews.org/ and http://cbl.abuseat.org/. It then waits for either a reply from the open relay database or a timer time out. If the timer does time out then set flag t_open_relay to false. If IP_0 is in an open relay database and the timer does not time out then set flag t_open_relay to true, else set flag t open relay to false. This test is based on the fact that many spammers try to hide their real IP address by sending their spam to an open relay MTA. Referring to FIG. 1, spammer's MTA 2 first sends the unsolicited message to open relay MTA 6. Open relay MTA 6 then contacts MTA 5 to relay the unsolicited message to client MTA 5. Client MTA 5 then thinks that it is receiving mail is from the open relay MTA 6 rather than the spamming MTA 2. It should also be noted that other public mail blacklists can also be checked in the same manner as checking the open relay databases.

Furthermore, many open relay databases as well as mail blacklists use DNS zone transfers as a query method so that any application can access these databases/blacklists by performing a simple DNS query. Under that scenario, a timer is implicitly set by using the time out mechanism built into DNS resolvers in the operating system or system libraries as explained above for FIG. 14.

FIG. 17A is a flowchart illustrating an exemplary method for performing the allow address test used in FIG. 11B, FIG. 12A, and FIG. 13B. If IP_0 is in the allow_address database then set flag t_allow to true, else set flag t_allow to false. The allow_address database contains the IP addresses of trusted MTAs, such as those associated with AOL, Earthlink, ATT, etc. FIG. 17B shows an exemplary data structure that can be used in the allow_address database. FIG. 17C shows some exemplary allow_address database entries.

Figures 18A, 18B, 18C:
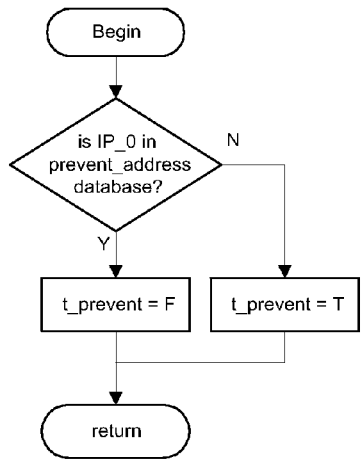
FIG. 18A is a flowchart illustrating an exemplary method for performing the prevent address test.
FIG. 18B shows an exemplary data structure that can be used in the prevent_address database.
FIG. 18C shows some exemplary prevent_address database entries.

FIG. 18A is a flowchart illustrating an exemplary method for performing the prevent address test used in FIG. 11B, FIG. 12A and FIG. 13B. If IP_0 is in the prevent_address database then set flag t_prevent to true, else set flag t_prevent to false. The prevent_address database contains the IP address of known or suspected spammers. This database can also contain MTA's that are not RFC compliant, such as those listed in http://www.rfc.ignorant.org. This database can also contain blocks of suspicious IP addresses such as those associated with dial-in, digit subscriber loop (DSL), and modem connections since there is no valid reason for direct-to-MTA SMTP traffic to originate from one of these IP addresses. An exemplary data structure that can be used in the prevent_address database is shown in FIG. 18B. FIG. 18C shows some exemplary prevent_address database entries. It should be noted that wildcards such as the symbol '*', "slash" notation and IP address ranges can be used. A wildcard character can be used to match addresses by octets, slash notation indicate how many most significant bits in the IP address should be matched, and IP address ranges give a starting and ending IP address to define a range.

Figure 19:
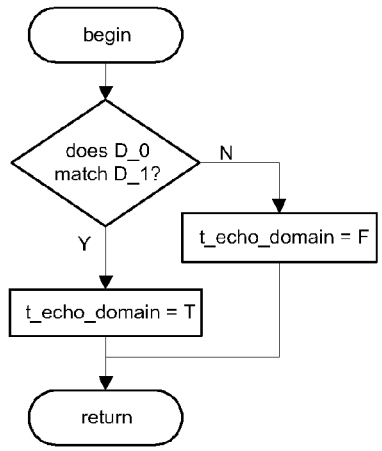
FIG. 19 is a flowchart illustrating an exemplary method for performing the echo domain test.

FIG. 19 is a flowchart illustrating an exemplary method for performing the echo domain test used in FIG. 11B, FIG. 12B and FIG. 13B. If declared domain D_0 does match the domain D_1 of MTA_1 then set flag echo_domain to true, else set flag echo_domain to false. This test is based on the fact that some spammers set their declared domain to a domain name trusted by MTA_1.

Figure 20:
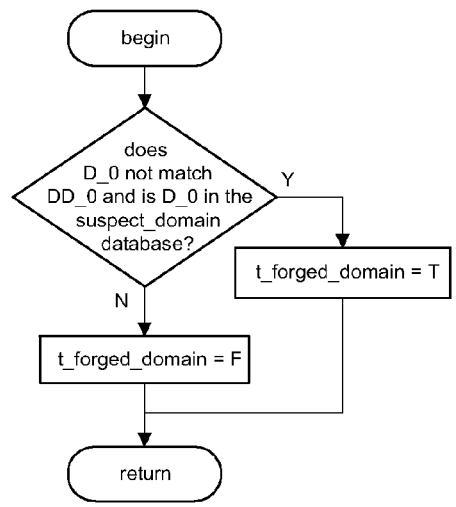
FIG. 20 is a flowchart illustrating an exemplary method for performing the forged domain test.

FIG. 20 is a flowchart illustrating an exemplary method for performing the forged domain test used in FIG. 11B, FIG. 12B and FIG. 13B. If the declared domain D_0 does not match the real domain name DD_0 and the declared domain D_0 is in the suspect_domain database then set flag t_forged_domain to true, else set flag t_forged_domain to false. The suspect_domain database is described below (see FIG. 22B). This test is based on the fact that some spammers hide their true domain name and assume popular domain names such as yahoo.com or hotmail.com however their declared domains D_0 does not match their real domain name DD_0.

FIG. 21A is a flowchart illustrating an exemplary method for performing the bad from address test used in FIG. 11C, FIG. 12C and FIG. 13C. If A_0 is in the bad_from database then set flag t_bad_from to true, else set flag t_bad_from to false. This test is based on the fact that some spammers use variations of the same from-address for different spam messages. FIG. 21B shows an exemplary data structure that can be used in the bad_from database. FIG. 21C shows examples of bad_from database entries. The bad from test is similar to a classic blacklist where known spamming return addresses are maintained in a database and the from address of incoming email addresses are compared against it. It should be noted that wildcard characters such as '*' and more advanced pattern matching expressions such as regular expressions can be used in place of or in addition to regular email addresses.

Figure 22A:
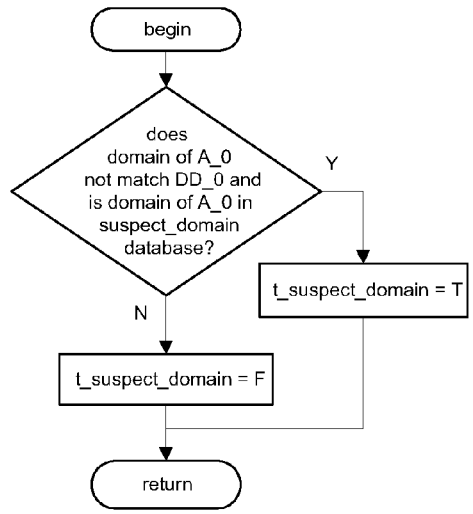
FIG. 22A is a flowchart illustrating an exemplary method for performing the suspect domain test.

FIG. 22A is a flowchart illustrating an exemplary method for performing the suspect domain test used in FIG. 11C, FIG. 12C, and FIG. 13C. If the domain of the from_address A_0 is in the suspect_domain database and if the real domain DD_0 does not match a domain listed in the suspect_domain database as a legitimately sending email using from-address A_0 then set flag t_suspect_domain to true, else set flag t_suspect_domain to false. The suspect_domain database contains a list of domains that are likely to be forged and have been profiled to determine which mail exchangers are authorized to send email from those domains. A_0 is often a popular domain name such as yahoo.com or hotmail.com or a well known domain such as ups.com or irs.gov. Spammers will often forge their from-address as one of these to deceive the receiving MTA into delivering the message. These forged domains are also used to encourage the recipient to open the message and read it. It should be noted that the suspect_domain database is not a list of bad domains. Quite to the contrary, the domains are often popular domains with a large number of legitimate email addresses. The suspect_domain database lists domains that, when they appear in a from_address A_0, are to be checked in accordance with the suspect domain test. When these from-addresses or declared domains (as in FIG. 20), are detected, the real domain name DD_0 of the sending MTA is obtained via DNS and compared to the suspect domain database to determine if the sending MTA is legitimate for the domain in from_address A_0. The real domain name DD_0 need not match from address A_0 as there are some domains that send legitimately from MTAs in multiple different domains. To account for this wildcards or equivalents can be implemented in the suspect_domain database so that from-address A_0 need only match one of the equivalent domain names.

The suspect domain database can also contains nonexistent domains and misspellings of popular domains that are commonly used to deceive recipients. Examples of these are paypal-us.com and pypal.com both of which are used to forge mail as coming from paypal.com. Since they are non-existent domains they will fail the suspect domain test.

Figure 22B:
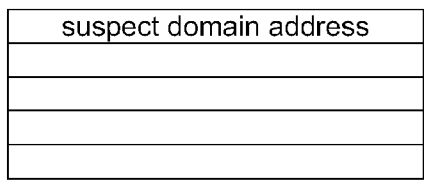
FIG. 22B shows an exemplary data structure that can be used in the suspect_domain database.

FIG. 22B shows an exemplary data structure that can be used in the suspect_domain database. This test is based on the fact that some spammers hide their true domain name and assume popular domain names such as yahoo.com or hotmail.com however the domain of their from-address A_0 does not match their real domain name DD_0.

Figure 23:
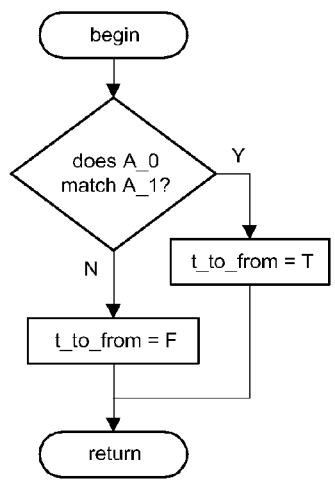
FIG. 23 is a flowchart illustrating an exemplary method for performing the "to from" test.

FIG. 23 is a flowchart illustrating an exemplary method for performing the "to from" test used in FIG. 11D, FIG. 12C and FIG. 13D. If from-address A_0 matches to-address A_1 then set flag t_to_from to true, else set flag t_to_from to false. The rationale for this test is that some spammers will disguise themselves as someone known to MTA_1 specifically the recipient's to-address A_1 is always known to MTA_1. In an alternative, to prevent false positives, all the legitimate MTA's that the user is known to use can be stored. If A_0 matches A_1 then IP_0 or D_0 is compared to a list of known sending MTAs for the user, if it is not among the known sending MTAs then t_to_from is set to true otherwise it is set to false.

Figures 24A, 24B:
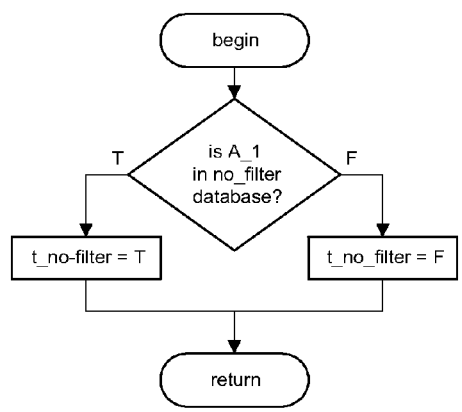
FIG. 24A is a flowchart illustrating an exemplary method for performing the "no filter" test.
FIG. 24B shows an exemplary data structure that can be used in the no_filter database

FIG. 24A is a flowchart illustrating an exemplary method for performing the "no filter" test used in FIG. 11D, FIG. 12C and FIG. 13D. If to-address A_1 is in the no_filter database then set flag t_no_filter to true, else set flag t_no_filter to false. FIG. 24B shows an exemplary data structure that can be used in the no_filter database. This test allows some users to be exempted from having their mail filtered.

Figures 25A, 25B:
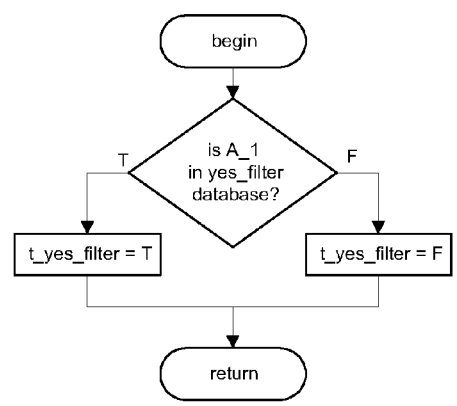
FIG. 25A is a flowchart illustrating an exemplary method for performing the "yes filter" test.
FIG. 25B shows an exemplary data structure that can be used in the yes_filter database.

FIG. 25A is a flowchart illustrating an exemplary method for performing the "yes filter" test used in FIG. 11D, FIG. 12C and FIG. 13D. If to-address A_1 is in the yes_filter database then set flag t_yes_filter to true, else set flag t_yes_filter to false. FIG. 25B shows an exemplary data structure that can be used in the yes_filter database. This test is based on the fact that some users want their mail filtered.

Figure 26A:
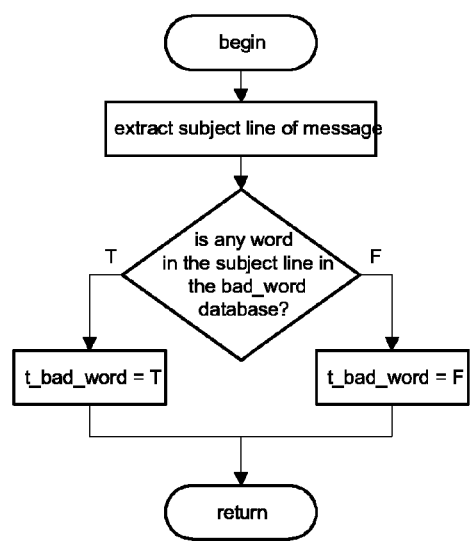
FIG. 26A is a flowchart illustrating an exemplary method for performing the bad word test.
Figure 26B:
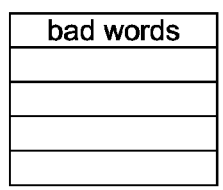
FIG. 26B shows an exemplary data structure that can be used in the bad_word database.

FIG. 26A is a flowchart illustrating an exemplary method for performing the bad word test used in FIG. 12D. The method begins by extracting the subject line from the body of the message. If any word in the subject line is in the bad word database then set flag t_bad_word to true, else set flag t_bad_word to false. FIG. 26B shows an exemplary data structure that can be used in the bad word database. This test is based on the fact that some spammers use words such as "porn" or "penis" in the subject line of their messages. One of ordinary skill in the art can appreciate extensions of this test that exploit the same sort of Bayesian analysis employed by content filters.

Figure 27A:
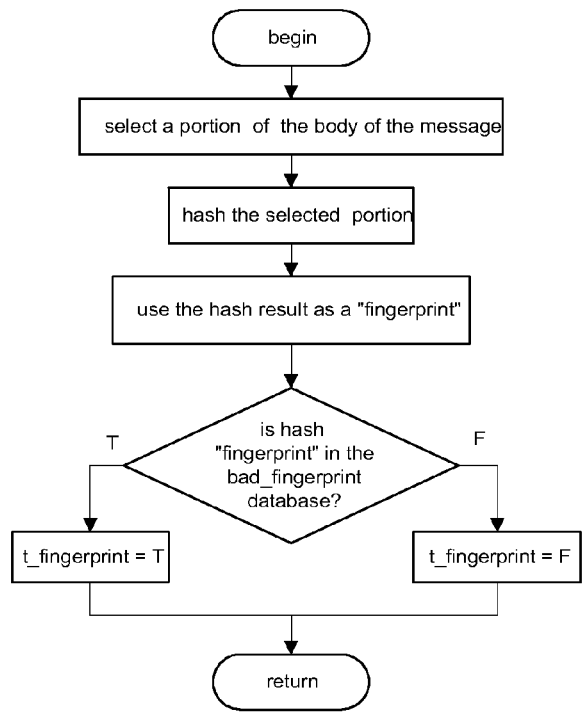
FIG. 27A is a flowchart illustrating an exemplary method for performing the bad fingerprint test.
Figure 27B:
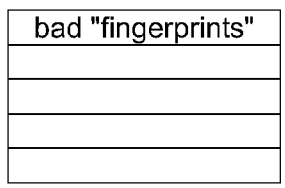
FIG. 27B shows an exemplary data structure that can be used in the bad_fingerprint database.

FIG. 27A is a flowchart illustrating an exemplary method for performing the bad fingerprint test used in FIG. 12D. The method begins by selecting a part of the body of the message. It then uses a cryptographic hash function such as MD-5 to compute a "fingerprint" of the message. If the hash "fingerprint" is in the bad fingerprint database then set flag t_bad_fingerprint to true, else set flag t_bad_fingerprint to false. FIG. 27B shows an exemplary data structure that can be used in the bad fingerprint database. This test is based on the fact that the message might be a copy of a previously detected spam message. Only part of the body of the message is fingerprinted because a spammer might customize a salutation line, etc.

FIG. 28 shows an exemplary data structure that can be used in the allowed_connection database. It logs the time and the to-address of a received message. If privacy issues are not of concern, the data structure could be expanded to also include the from-address of the message.

FIG. 29 shows an exemplary data structure that can be used in the rejected_connection database. It comprises entries for the time, to-address, from-address and reason for rejection.

Both the allowed_connection and rejected_connection databases could be used for statistical and billing purposes. Furthermore, both databases could be expanded to include the sending MTA's IP address.

FIG. 30 shows an exemplary data structure that can be used in the save_spam database. It comprises an entry for each user. Each entry comprises a to-address for the user and an indicator to indicate whether the user wishes to save spam messages. While it is advantageous for each user to have an entry, it is not required nor necessary.

FIG. 31 shows an exemplary data structure that can be used in the diversion database. It comprises an entry for each user. Each entry comprises a to-address for the user and a diversion to-address where spam messages are to be sent. Not all users need to have an entry in the database for example, if the user does not have a "save spam" indicator in the save_spam database, there is no need to create an entry in the database. On the other hand, an entry could be included in the even the user later elects to save spam. Additionally the diversion database while conceptually shown as separate can be merged with the save_spam database.

Multiple spam blockers can be inserted in front of a client MTA to scale the spam processing. Load among the spam blockers can be distributed by adding an MX record for the client's domain for each spam blocker. Assigning equal priority to each MX record can help to insure even load distribution.

The deployment of the spam blocker can also be made failsafe by inserting multiple spam blockers in from of the client MTA as described above. Should one spam blocker go offline, a sending MTA should attempt delivery to one of the alternate spam blockers as proscribed by the convention in the use of MX records.

In summary, the embodiments of the spam blocker described herein can reduce the Internet bandwidth consumed by unsolicited messages, can reduce the communications bandwidth consumed between the client's message transfer agent and mail user agent, can reduce the amount of storage consumed by unsolicited messages, and can eliminate unsolicited messages from a client's e-mail box. This is accomplished by rejecting an unsolicited message before the body of the message is transferred to the client's message transfer agent.

Embodiments of the spam blocker described herein also can improve the ability to detect unsolicited messages. This is accomplished by using the sending MTA's IP address, IP_0 which cannot be forged. The problem is that content based tests suffer from the fact that the declared domain, from-address, subject line, or message body can easily be forged or changed. IP_0 cannot be forged because a forged IP_0 would cause the receiving MTA's 220 reply to be sent to the wrong address and without a 220 reply the sending MTA would never be able to establish the requested connection. Source based tests are thus based on "bedrock" information while content based tests are based on "shifting sands." This improves the ability of the spam blocker to detect suspected unsolicited messages.

By using a separate spam blocker there is no need for users to install software on their individual systems and the need to change the client's current message transfer agent. This is accomplished by positioning the spam blocker between the sending and receiving message transfer agents and not between the receiving message transfer agent and the mail user agent. This is further accomplished by not positioning the spam blocker as a message transfer agent add-on or mail user agent add-on. This is further accomplished by keeping the communications between the spam blocker and the sending and receiving message transfer agents standard SMTP protocol and eliminating other in-band or out-of-band communications channels between the spam blocker and the sending message transfer agent, receiving message transfer agent, or the mail user agent.

Though the spam blocker is described as separate from an MTA, it can also be incorporated with an MTA into a network appliance. A separate spam blocker appliance is beneficial to a user with an existing MTA seeking only to improve their spam stopping ability, while an integrated network appliance is beneficial to a user seeking to build a network and is looking for fewer network appliances.

Embodiments of the spam blocker provide options for logging which messages have been allowed or rejected by storing the information in an allowed_connection and a rejected_connection databases. This is further accomplished by deferring the decision equation until after the to-address A_1 has been transmitted and captured. Furthermore, options that allow users to select the ability not to block unsolicited messages can be implemented by the no_filter test and the no_filter database. A complementary option allows users to select the ability to block unsolicited messages which can be implemented by the yes_filter test and the yes_filter database.

In some embodiments, feedback is given to the sender of a blocked message by issuing a permanent negative completion reply such as a 554 reply to the sending message transfer agent if a message is determined to be unsolicited. The sending message transfer agent will then either send an error message to the sender or send the message back to the message transfer agent that sent the message. This is important since most spam blocking agents either delete or divert the spam into a junk folder and does not return negative completion messages to the original sender. The sender of a false positive unsolicited message would thus have no knowledge that the message was not delivered.

The spam blocker algorithms as shown in FIGS. 11A-11F, 12A-12E and 13A-13F are structured for clarity rather efficiency. It is assumed that anyone skilled in the art can restructure the spam blocker algorithm for efficiency The DNS and open relay database server time out problems can be mitigated or avoided by setting up local versions of these servers. For example, the spam blocker can set up a local named process which can be configured as a DNS cache. All, none or any subset of the tests described in figures can be used or omitted. They can be performed in any order at any time before the appropriate decision equation is evaluated. Furthermore, embodiments of the spam blocker are not limited to the tests disclosed and more tests can be added. Furthermore, the decision equation has to be modified if any of the tests are not used or more tests are added. Should a test be omitted, the corresponding result flag should be omitted from the decision equation. Should a test be added a corresponding result flag should be defined and added to the decision equation. While a 554 reply was used to force MTA_0 to QUIT the connection, other 5XX permanent negative completion replies could also be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method comprising:
    relaying and monitoring simple mail transfer protocol (SMTP) messages exchanged between a transmitting message transfer agent (MTA_0) and a receiving message transfer agent (MTA_1) during a communications connection;
    intercepting a .\r\n end-of-message indicator reply from MTA_0 while the communications connection remains open;
    determining if an email-message is unsolicited by analyzing the monitored SMTP messages while the communications connection remains open; and
    releasing the .\r\n end-of-message indicator reply to MTA_1 if the message is determined not to be unsolicited, whereas,
    sending an error reply to MTA_0 to force MTA_0 to close the communications connection if the message is determined to be unsolicited.

2. An apparatus comprising:
    a communications port; and
    means for
        relaying and monitoring SMTP messages exchanged between a transmitting message transfer agent (MTA_0) and a receiving message transfer agent (MTA_1) during a communications connection;
        intercepting a .\r\n end-of-message indicator reply from MTA_0 while the communications connection remains open;
        determining if an e-mail message is unsolicited by analyzing the monitored SMTP messages while the communications connection remains open;
        releasing the .\r\n end-of-message indicator reply to MTA_1 if the message is determined not to be unsolicited, whereas,
        sending an error reply to MTA_0 to force MTA_0 to close the communications connection if the message is determined to be unsolicited.

3. A network appliance comprising:
    a network interface;
    a processor controlling the network interface;
    a memory comprising instructions that cause the processor
        to use the network interface
        to relay and monitor SMTP messages exchanged between a transmitting message transfer agent (MTA_0) and a receiving message transfer agent (MTA_1) during a communications connection;
        to intercept a .\r\n end-of-message is unsolicited by analyzing the monitored SMTP messages while the communications connection remains open; and
        to release the .\r\n end-of-message indicator reply to MTA_1 if the message is determined not to be unsolicited, whereas,
        to send an error reply to MTA_0 to force MTA_0 to close the communications connection if the message is determined to be unsolicited.

* * * * *